US009534636B2

(12) United States Patent
Takayama et al.

(10) Patent No.: US 9,534,636 B2
(45) Date of Patent: Jan. 3, 2017

(54) ROLLING BEARING UNIT WITH COMBINATION SEAL RING

(71) Applicant: NSK LTD., Tokyo (JP)

(72) Inventors: Akinobu Takayama, Fujisawa (JP); Yasuhiro Shiono, Fujisawa (JP); Masamitsu Watanabe, Fujisawa (JP); Masayoshi Tanahashi, Fujisawa (JP); Hironari Sakoda, Fujisawa (JP)

(73) Assignee: NSK LTD., Tokyo (JP)

( * ) Notice: Subject to any disclaimer, the term of this patent is extended or adjusted under 35 U.S.C. 154(b) by 216 days.

(21) Appl. No.: 14/361,096

(22) PCT Filed: Nov. 29, 2012

(86) PCT No.: PCT/JP2012/080992
§ 371 (c)(1),
(2) Date: May 28, 2014

(87) PCT Pub. No.: WO2013/081075
PCT Pub. Date: Jun. 6, 2013

(65) Prior Publication Data
US 2015/0117805 A1    Apr. 30, 2015

(30) Foreign Application Priority Data

Nov. 29, 2011 (JP) ................................ 2011-260400
May 16, 2012 (JP) ................................ 2012-112579
Jul. 12, 2012 (JP) ................................ 2012-156691

(51) Int. Cl.
*F16C 33/80* (2006.01)
*F16C 41/00* (2006.01)
(Continued)

(52) U.S. Cl.
CPC ........... *F16C 33/805* (2013.01); *F16C 33/768* (2013.01); *F16C 33/7823* (2013.01);
(Continued)

(58) Field of Classification Search
CPC ... F16C 19/186; F16C 33/7823; F16C 33/768; F16C 33/7883; F16C 33/805; F16C 41/007; F16C 2326/02; F16J 15/3264; B60B 27/0005; B60B 27/0073
(Continued)

(56) References Cited

U.S. PATENT DOCUMENTS 4,252,329 A * 2/1981 Messenger ........... F16J 15/3264
                                                 277/551
4,822,055 A * 4/1989 Hogan ................ F16J 15/3264
                                                 277/387
(Continued)

FOREIGN PATENT DOCUMENTS

EP    1496293 A1    1/2005
EP    2213913 A1    8/2010
(Continued)

OTHER PUBLICATIONS

International Search Report (PCT/ISA/210), dated Jan. 29, 2013, issued by the International Searching Authority in counterpart International Patent Application No. PCT/JP2012/080992.
(Continued)

*Primary Examiner* — Marcus Charles
(74) *Attorney, Agent, or Firm* — Sughrue Mion, PLLC

(57) ABSTRACT

A structure which ensures a movement of a seal lip disposed in a seal lip is realized by preventing foreign matters from permeating a seal internal space between a slinger and a seal ring. A labyrinth seal is disposed between an outer peripheral edge of a rotary side annular portion configuring the slinger and an inner peripheral surface of a stationary side cylindrical portion of a metal insert configuring the seal ring. In addition, a thickened portion is formed in a portion of an elastic member configuring the seal ring over an entire periphery. An auxiliary seal lip whose rigidity is lower than that of respective seal lips is disposed in the thickened
(Continued)

portion over the entire periphery. The auxiliary seal lip prevents the foreign matters from adhering to the seal lip, and prevents the movement of the seal lip from being hindered.

10 Claims, 19 Drawing Sheets

(51) Int. Cl.
G01P 3/42 (2006.01)
F16C 33/78 (2006.01)
G01P 3/44 (2006.01)
F16J 15/32 (2016.01)
F16C 33/76 (2006.01)
F16C 19/18 (2006.01)

(52) U.S. Cl.
CPC ........ *F16C 33/7883* (2013.01); *F16C 41/007* (2013.01); *F16J 15/3264* (2013.01); *G01P 3/443* (2013.01); *F16C 19/186* (2013.01); *F16C 2326/02* (2013.01)

(58) Field of Classification Search
USPC ........ 384/448, 477, 480, 484, 486; 277/349, 277/353, 562
See application file for complete search history.

(56) References Cited

U.S. PATENT DOCUMENTS

| | | | | |
|---|---|---|---|---|
| 5,890,812 A * | 4/1999 | Marcello | ............ | F16C 33/7813 384/482 |
| 5,975,534 A * | 11/1999 | Tajima | ................. | F16J 15/3264 277/353 |
| 6,170,992 B1 | 1/2001 | Angelo et al. | | |
| 6,206,380 B1 * | 3/2001 | Miyazaki | ............... | F16C 19/184 277/551 |
| 7,118,280 B2 * | 10/2006 | Vignotto | ............. | F16C 33/7883 384/484 |
| 7,232,129 B2 * | 6/2007 | Kobayashi | ............ | F16C 41/007 277/317 |
| 8,087,673 B2 * | 1/2012 | Kobayashi | .......... | F16C 33/7879 384/448 |
| 2009/0058011 A1 * | 3/2009 | Shibayama | ......... | B60B 27/0005 277/361 |
| 2010/0046873 A1 * | 2/2010 | Takimoto | ............. | F16J 15/3264 384/478 |

FOREIGN PATENT DOCUMENTS

| | | | |
|---|---|---|---|
| JP | 09274051 A | * | 10/1997 |
| JP | 2001-215132 A | | 8/2001 |
| JP | 2001-289254 A | | 10/2001 |
| JP | 2002-206550 A | | 7/2002 |
| JP | 2004-144179 A | | 5/2004 |
| JP | 2005-291450 A | | 10/2005 |
| JP | 2006-322536 A | | 11/2006 |
| JP | 2007-85478 A | | 4/2007 |
| JP | 2007-285500 A | | 11/2007 |
| JP | 2008-128396 A | | 6/2008 |
| JP | 2008-151311 A | | 7/2008 |
| JP | 2008-267423 A | | 11/2008 |
| JP | 2009-127660 A | | 6/2009 |
| JP | 2009-168103 A | | 7/2009 |
| JP | 2009-197884 A | | 9/2009 |
| JP | 2010060127 A | * | 3/2010 |
| JP | 2010091036 A | * | 4/2010 |
| JP | 2010-185465 A | | 8/2010 |
| JP | 2010-230059 A | | 10/2010 |
| JP | 2011-25586 A | | 2/2011 |
| WO | 2011/047928 A1 | | 4/1916 |
| WO | WO 2006080209 A1 * | 8/2006 | ............ F16C 19/187 |
| WO | 2009/145178 A1 | | 12/2009 |
| WO | 2011/086982 A1 | | 7/2011 |

OTHER PUBLICATIONS

Written Opinion (PCT/ISA/237), dated Jan. 29, 2013, issued by the International Searching Authority in counterpart International Patent Application No. PCT/JP2012/080992.
Communication from the State Intellectual Property Office of P.R. China dated Nov. 25, 2015 in a counterpart Chinese application No. 201280058898.7.
Communication issued on Nov. 5, 2015 by the European Patent Office in related Application No. 12852764.5.
Communication dated Apr. 12, 2016 issued by the Japanese Patent Office in counterpart Japanese Patent Application No. 2012-257064.

* cited by examiner

ROLLING BEARING UNIT WITH COMBINATION SEAL RING

TECHNICAL FIELD

The present invention relates to an improvement in a rolling bearing unit with a combination seal ring which is configured so that the combination seal ring formed of a slinger and a seal ring closes an end portion opening of a bearing internal space which is present between peripheral surfaces where a rotary side race ring and a stationary side race ring oppose each other and in which multiple rolling elements are installed, for example, out of rolling bearing units for rotatably supporting wheels of a vehicle with respect to a suspension device. Specifically, the present invention aims to realize a structure which can satisfactorily maintain sealing performance using the combination seal ring over a long period of time by reducing an amount of foreign matters permeating a seal internal space which is present between the slinger and the seal ring.

BACKGROUND ART

As a rolling bearing unit for rotatably supporting wheels of a vehicle with respect to a suspension device, for example, Patent Document 1 discloses a structure of a rolling bearing unit for supporting wheels as illustrated in FIG. 18. In a rolling bearing unit 1 illustrated in FIG. 18, an outer ring 2 serving as a stationary side race ring and a hub 3 serving as a rotary side race ring are arranged to be concentric with each other. Then, each set of multiple balls 6 and 6 respectively serving as rolling elements is arranged in each double row between double row outer ring races 4 and 4 disposed on an inner peripheral surface of the outer ring 2 and respectively serving as the stationary side races and double row inner ring races 5 and 5 disposed on an outer peripheral surface of the hub 3 and respectively serving as the rotary side races. The respective balls 6 and 6 are held by respective retainers 7 and 7 so as to be rollable. This configuration allows the hub 3 to be rotatably supported on an inner diameter side of the outer ring 2. In order to rotatably support the wheels with respect to the suspension device, a stationary side flange 8 disposed on the outer peripheral surface of the outer ring 2 is fixedly screwed to the suspension device, and the wheels and a braking rotor such as a disc rotor is fixedly screwed to a rotary side flange 9 formed on the outer peripheral surface of an outboard end portion of the hub 3 (an outboard side is referred to as a left side in each drawing which is an outer side in a width direction of a vehicle in a state of being assembled in the vehicle. In contrast, a right side in each drawing which is an inner side in the width direction of the vehicle is referred to as an inboard side).

Both end openings of a bearing internal space 10 in which the respective balls 6 and 6 are installed between the inner peripheral surface of the outer ring 2 and the outer peripheral surface of the hub 3 are respectively closed over an entire periphery by a seal ring 11 and a combination seal ring 12. The seal ring 11 which closes an outboard end side opening of the bearing internal space 10 is formed by reinforcing an elastic member 14 made of an elastomer such as rubber using a metal insert 13 made of a metal plate and by configuring an entire body to have an annular shape. In addition, the elastic member 14 has multiple (three in an illustrated example) seal lips 15a, 15b and 15c. Then, in a state where the metal insert 13 is tightly and internally fitted to an outboard end portion on the inner peripheral surface of the outer ring 2, distal end edges of the respective seal lips 15a, 15b and 15c are respectively brought into sliding contact with an inboard side surface of the rotary side flange 9 or an outer peripheral surface of an intermediate portion of the hub 3, over the entire periphery.

In addition, the combination seal ring 12 is formed by combining the slinger 16 and the seal ring 17. The slinger 16 is configured so that an entire body is annularly stamped in an L-shape in cross-section by bending a metal plate, and is configured to have a rotary side cylindrical portion 18 and a rotary side annular portion 19 which is bent radially outward from an inboard end edge of the rotary side cylindrical portion 18. This slinger 16 is fixed to the hub 3 by tightly and externally fitting the rotary side cylindrical portion 18 to the inboard end portion of the hub 3 (a hub body and inner ring configuring the hub 3). In addition, the seal ring 17 includes a metal insert 20 made of a metal plate and an elastic member 21. The elastic member 21 includes multiple (three in an illustrated example) seal lips 22a, 22b and 22c. In addition, the metal insert 20 is configured so that an entire body is annularly stamped in an L-shape in cross-section by bending a metal plate, and is configured to have a stationary side cylindrical portion 23 and a stationary side annular portion 24 which is bent radially inward from an outboard end edge of the stationary side cylindrical portion 23. The seal ring 17 including this metal insert 20 is fixed to the outer ring 2 by tightly and internally fitting the stationary side cylindrical portion 23 to the inboard end portion of the outer ring 2. In addition, in this state, a distal end edge of the seal lip 22a is brought into sliding contact with an outboard side surface of the rotary side annular portion 19, and distal end edges of the respective seal lips 22b and 22c are respectively brought into sliding contact with an outer peripheral surface of the rotary side cylindrical portion 18, over the entire periphery.

There is also a case where out of both axial side surfaces of the rotary side annular portion 19 of the slinger 16 configuring the above-described combination seal ring 12, an annular encoder 25 is fixedly attached to a side surface (inboard side surface) opposite to a bending direction of the rotary side cylindrical portion 18 over the entire periphery, as illustrated in FIG. 19A. The encoder 25 is made of a permanent magnet such as a rubber magnet or a plastic magnet in which magnetic powder is dispersed in a high polymer material such as rubber or synthetic resin and an entire body is formed to have an annular shape. The encoder 25 is magnetized in the axial direction. The magnetized directions vary alternately and at equal intervals in a circumferential direction. Accordingly, S poles and N poles are arranged alternately and at equal intervals in the circumferential direction on an inboard side surface of the encoder 25 which is a detection target surface. It is possible to measure a rotation speed of the wheels rotating with the hub 3 by causing a detection portion of a rotation detection sensor (not illustrated) to oppose the detection target surface of the above-described encoder 25. Then, the measured signal indicating the rotation speed of the wheels is used in controlling a travelling stabilization device of a vehicle such as an anti-lock braking system (ABS) and a traction control system (TCS). A structure and an operation of this rotation speed detection device are known in the related art. Accordingly, since these are not related to the gist of the present invention, illustration and detailed description will be omitted.

In contrast, when it is not necessary to detect the rotation speed of the vehicle, or when it is possible to detect the rotation speed by using a different portion, it is not necessary to dispose an encoder in the slinger 16 as illustrated in FIG. 19B.

In any case, two axial end openings of the bearing internal space 10 are closed by the seal ring 11 and the combination seal ring 12, respectively over the entire periphery. This manner prevents leakage of grease which is present inside the bearing internal space 10, and prevents foreign matters such as moisture and dust which are present in an external space from permeating the bearing internal space 10.

In order to ensure durability of the rolling bearing unit 1 for supporting the wheels, it is important to ensure sealing performance of the seal ring 11 and the combination seal ring 12. On the other hand, the seal ring 11 and the combination seal ring 12 are used under severe conditions where muddy water is sprayed thereon when in use. In particular, in a case of the combination seal ring 12, there is a possibility that moisture of the muddy water which has permeated the seal internal space 26 surrounded by the slinger 16 and the seal ring 17 may be evaporated and only a solid portion (mud) may be accumulated inside the seal internal space 26. In a case of the structure in the related art which is illustrated in FIGS. 18, 19A and 19B, a volume is large in a space close to the outside 28 which is present in a portion further radially outward than the seal lip 22a present in the outermost diameter side within the seal internal space 26 and which communicates with the external space via the labyrinth seal 27. Accordingly, an amount of the solid portion accumulated inside the space close to the outside 28 is likely to increase. Then, there is a possibility that the solid portion accumulated inside the space close to the outside 28 may also adhere to the seal lip 22a present in the outermost diameter side and may hinder a movement of the seal lip 22a. As a result, there is a possibility that a portion of the distal end edge of the seal lip 22a may be lifted from an outboard side surface of the rotary side annular portion 19 of the slinger 16 and the foreign matters such as the muddy water may more deeply permeate the seal internal space 26 through the lifted portion. This phenomenon becomes particularly conspicuous in the muddy water containing clay soil which is likely to be condensed by evaporation of moisture.

If a clearance dimension (width dimension in the radial direction) of the labyrinth seal 27 is decreased, it is possible to reduce the foreign matters such as the muddy water permeating the space close to the outside 28. However, there is a limit in decreasing the clearance dimension. That is, if the clearance dimension of the labyrinth seal 27 is greatly decreased, there is a possibility that a moment load applied during the turning of a vehicle may cause the outer ring 2 and the hub 3 to be relatively tilted, a distance of the labyrinth seal 27 may be shortened, and an end edge of the rotary side annular portion 19 and an inner peripheral surface of the stationary side cylindrical portion 23 may come into intense (strong) contact with each other. Therefore, in the structure in the related art which is illustrated in FIGS. 18, 19A and 19B, it is difficult to greatly decrease the clearance dimension of the labyrinth seal 27.

As a structure for improving the sealing performance of the combination seal ring. Patent Document 2 discloses a structure in which a distal end edge of a second seal lip configuring a second seal ring externally fitted to an outer ring is brought into sliding contact with a side surface which is an opposite side to the seal ring within the rotary side annular portion of the slinger, over the entire periphery. According to this structure, it is possible to sufficiently prevent the foreign matters from permeating the seal internal space. However, the number of components is increased and the cost is increased. In addition, there is a possibility that an installation space for disposing the second seal ring is increased and design freedom may be limited in order to prevent interference with other articles disposed adjacent to the rolling bearing unit with the combination seal ring. Furthermore, as the second seal lip, those which have rigidity equivalent to that of the seal lip originally disposed on the combination seal ring side are disposed by being added to the originally disposed seal lip. Therefore, there is a disadvantage in that a sliding contact portion is increased and drag torque (rotational dynamic torque) is increased.

RELATED ART REFERENCE

Patent Document

Patent Document 1: JP-A-2007-85478
Patent Document 2: JP-A-2008-151311

SUMMARY OF THE INVENTION

Problems to be Solved by the Invention

The present invention is made in view of the above-described circumstances, and aims to realize a structure which closes an end portion opening of a bearing internal space present between both stationary side and rotary side race rings configuring a rolling bearing unit and which can prevent foreign matters from permeating a seal internal space between a slinger and a seal ring, all of which configure a combination seal ring, aims to ensure a movement of a seal lip disposed in the seal ring, and aims to realize a structure which can maintain satisfactory sealing performance over a long period of time.

Means for Solving the Problems

A rolling bearing unit with a combination seal ring according to the present invention includes a rotary side race ring, a stationary side race ring, multiple rolling elements, and a combination seal ring.

The rotary side race ring and the stationary side race ring are relatively rotated in a state of being arranged concentric with each other.

In addition, the respective rolling elements are disposed to be rollable between a rotary side race and a stationary side race which are respectively disposed on a peripheral surface where the rotary side race ring and the stationary side race ring oppose each other.

In addition, the combination seal ring closes an end portion opening of a bearing internal space present between the peripheral surfaces where the rotary side race ring and the stationary side race ring oppose each other, and is configured to have a slinger and a seal ring.

The slinger is fixedly fitted to a portion opposing the peripheral surface of the stationary side race ring, within a portion of the peripheral surface of the rotary side race ring, is configured to have an overall annular shape whose cross-section has an L-shape by burring and stamping a metal plate, and includes a rotary side cylindrical portion and a rotary side annular portion which is radially bent from an axial end edge of the rotary side cylindrical portion toward the stationary side race ring. Then, the rotary side cylindrical portion is fixed to the rotary side race ring by being fitted to the peripheral surface of the rotary side race ring.

In addition, the seal ring is fixedly fitted to a portion opposing the slinger, within a portion of the stationary side race ring, and includes a metal insert which is fixedly fitted to the stationary side race ring, and an elastic member whose proximal end portion is supported by the metal insert and which has multiple seal lips. The metal insert is configured to have an overall annular shape whose cross-section has an L-shape by bending and molding a metal plate, and includes a stationary side annular portion and a stationary side annular portion which is radially bent from an axial end edge of the stationary cylindrical portion toward the rotary side race ring. Then, the stationary side cylindrical portion is fixed to the stationary side race ring by being fitted to the peripheral surface of the stationary side race ring, and a distal end portion of the respective seal lips is brought into sliding contact with a surface of the slinger over an entire periphery.

Furthermore, a labyrinth seal is disposed between a distal end side peripheral edge (peripheral edge of the opposite side to the rotary side cylindrical portion in the radial direction) of the rotary side annular portion and the peripheral surface of the stationary side cylindrical portion.

In particular, in the rolling bearing unit with a combination seal ring according to the present invention, an auxiliary seal lip whose rigidity is lower than a seal lip close to an external space which is at least a seal lip closest to the labyrinth seal, out of the respective seal lips, is disposed integrally with the elastic member, in a portion closer to the stationary side cylindrical portion than the respective seal lips, within a base of the elastic member, and a distal end edge of the auxiliary seal lip is brought into sliding contact with or is caused to closely oppose an axial side surface of the rotary side annular portion over the entire periphery.

When the present invention as described above is embodied, preferably, a peripheral surface of a side having the stationary side annular portion within the stationary side cylindrical portion is covered by the elastic member. Then, both inner and outer peripheral edge portions of a portion covering an axial side surface of the stationary side annular portion within the elastic member, a portion covering the peripheral surface, and a base of the auxiliary seal lip are formed smoothly and continuously by a curved surface whose cross-section has a quarter arcuate shape.

Alternatively, in a state where the seal ring and the slinger are combined and a distal end portion of the seal lip close to the external space is brought into elastic contact with an axial side surface of the rotary side annular portion, a distal end edge of the seal lip close to the external space is caused to closely oppose one side peripheral surface of the auxiliary seal lip. A degree of closely opposing each other is set so that a fluid permeating through the labyrinth seal and pressing the other side peripheral surface of the auxiliary seal lip causes the auxiliary seal lip to be close so as not to be radially inverted (so as not to be radially turned over).

Alternatively, a thickened portion whose radial and axial thickness dimension is larger than a thickness dimension of other portions is disposed in a portion where one radial side and one axial side are partitioned by the peripheral surface of the stationary side cylindrical portion and the axial side surface of the stationary side annular portion, within a portion of the elastic member. Then, a proximal end portion of the auxiliary seal lip is continuously formed in a portion close to the respective seal lips in the radial direction within an axial end surface of the thickened portion.

When such an aspect is embodied, preferably, recesses which respectively open on the axial end surface of the thickened portion are formed in multiple places in the circumferential direction of a radially intermediate portion of the thickened portion. Then, the proximal end portion of the auxiliary seal lip is positioned in a portion closer to the respective seal lips than the respective recesses within the axial end surface of the thickened portion.

Alternatively, when the present invention is embodied, the stationary side annular portion is caused to have a stepped shape including a proximal end side annular portion closest to the stationary side cylindrical portion in the radial direction, a tilted portion having a partially conical shape which is tilted in a direction away from the rotary side annular portion as it goes toward the distal end side, continuously in the radial direction from a distal end side peripheral edge of the proximal end side annular portion, and a distal end side annular portion which is continuously formed in the radial direction from a distal end side peripheral edge of the tilted portion and which is parallel to the proximal end side annular portion. Then, the proximal end portion of the auxiliary seal lip is positioned in a distal end side portion of the proximal end side annular portion.

Alternatively, a projection which axially projects toward the rotary side annular portion is formed in a radially intermediate portion of the stationary side annular portion over the entire periphery, and the proximal end portion of the auxiliary seal lip is positioned in a distal end portion of the projection.

Alternatively, by bending a portion close to a distal end of a radially intermediate portion of the rotary side annular portion over the entire periphery in the thickness direction of the rotary side annular portion, the distal end portion of the rotary side annular portion is positioned on the further stationary side annular portion than the intermediate portion or the proximal end portion, and the distal end edge of the auxiliary seal lip is brought into sliding contact with or is caused to closely oppose the axial side surface of the distal end portion of the rotary side annular portion over the entire periphery.

When such an aspect is embodied, for example, a portion of the elastic member is disposed in a state of covering a peripheral surface which is the opposite side to the stationary side race ring within both inner and outer peripheral surfaces of the stationary side cylindrical portion. In addition, a hooking lip which radially projects toward the rotary side cylindrical portion from a portion thereof is intermittently disposed in the circumferential direction in a portion which is the opposite side to the stationary side annular portion across the distal end portion of the rotary side annular portion, within the elastic member which covers peripheral surfaces thereof. Furthermore, the distal end portion of the locking lip and the distal end portion of the rotary side annular portion are axially overlapped with each other. Then, the slinger and the seal ring are prevented from being separated from each other.

In addition, when the present invention is embodied, for example, the rotary side race ring is an inner diameter side race ring which is present on a radially inner side, and the stationary side race ring is an outer diameter side race ring which is present on a radially outer side. In addition, the auxiliary seal lip is caused to have a shape of being tilted in a direction where a diameter increases as it goes toward the distal end edge. Then, the distal end edge of the auxiliary seal lip is caused to closely oppose the axial side surface of the rotary side annular portion in a non-contact state over the entire periphery, and a labyrinth seal is disposed over the entire periphery between the distal end edge of the auxiliary seal lip and the axial side surface of the rotary side annular portion.

When such an aspect is embodied, for example, a shape of at least the intermediate portion or the distal end edge portion within the auxiliary seal lip is partially conical tubular shape.

Alternatively, the auxiliary seal lip has an arcuate shape in a cross section in which an outer peripheral surface is a concave surface. Then, a tangential direction of a portion opposing the axial side surface of the rotary side annular portion within the distal end portion of the auxiliary seal lip is parallel to the axial side surface.

Alternatively, the auxiliary seal lip is configured to have an intermediate portion having a partially conical tubular shape and an annular flange portion which is radially bent outward from a distal end edge of the intermediate portion, and the flange portion and the axial side surface of the rotary side annular portion closely oppose each other over the entire periphery.

In addition, when the present invention is embodied, for example, the distal end edge of the auxiliary seal lip is brought into sliding contact with the axial side surface of the rotary side annular portion. In addition, a shape in the circumferential direction of at least a portion in sliding contact with the axial side surface within the distal end edge is an uneven shape. Then, the distal end edge is intermittently brought into sliding contact with the axial side surface in the circumferential direction.

In addition, when the present invention is embodied, for example, an encoder made of a permanent magnet which is formed in an overall annular shape by dispersing magnetic powder in a high polymer material is fixedly attached to an opposite side surface to a surface opposing the stationary side annular portion within both axial side surfaces of the rotary side annular portion. Then, a peripheral edge of the encoder is caused to oppose a peripheral surface of the stationary side cylindrical portion, and a labyrinth seal is disposed in the portion.

When such an aspect is embodied, preferably, a portion of the high polymer material configuring the encoder is used to form a projection which projects, over the entire periphery, toward the stationary side annular portion side by crossing over a distal end side peripheral edge of the rotary side annular portion. Then, the labyrinth seal is provided by including a portion between a peripheral surface of the projection and a peripheral surface of the stationary side annular portion.

Furthermore, when the present invention is embodied, for example, the rotary side race ring is an inner diameter side race ring which is present on a radially inner side, and the stationary side race ring is an outer diameter side race ring which is present on a radially outer side. Then, a portion whose outer diameter is the largest within an outer peripheral surface of the encoder is present on an axially opposite side to the rotary side annular portion across the locking lip.

Alternatively, the portion whose outer diameter is the largest within the outer peripheral surface of the encoder is disposed in a portion close to an inboard side within an axially intermediate portion of the outer peripheral surface.

Advantage of the Invention

According to the rolling bearing unit with a combination seal ring of the present invention configured as described above, it is possible to effectively prevent foreign matters such as muddy water from permeating a portion adjacent to a seal lip close to an external space (the above-described space close to an outside 28 illustrated in FIGS. 18, 19A and 19B), within a seal internal space present between a slinger and a seal ring which configure the combination seal ring. That is, in a case of the rolling bearing unit with the combination seal ring of the present invention, the space close to the outside which communicates with the external space via a labyrinth seal is radially divided into two by an auxiliary seal lip. Then, the auxiliary seal lip is present between the seal lip close to the external space and the labyrinth seal.

As a result, by decreasing to a minimum an amount of the foreign matters such as the muddy water which reaches the seal lip close to the external space, it is possible to prevent the movement of the seal lip close to the external space from being hindered by a large amount of solid portions adhering to the seal lip close to the external space. As a result, it is possible to ensure durability of the roll bearing unit with the combination seal ring by showing satisfactory sealing performance over a long period of time.

In addition, since the auxiliary seal lip has rigidity lower than that of the respective seal lips, even if the distal end edge of the auxiliary seal lip rubs against the rotary side annular portion of the slinger, frictional force acting on the rubbed portion can be suppressed to be low. Therefore, an increase in drag torque of the rolling bearing unit with the combination seal ring which is caused by disposing the auxiliary seal lip can be suppressed to be extremely low.

It is unavoidable to some extent that the foreign matters such as the muddy water passing through the labyrinth seal adheres to the auxiliary seal lip. However, there is little possibility that the foreign matters whose momentum is weakened by passing through the labyrinth seal may elastically deform the auxiliary seal lip and may reach the seal lip close to the external space. Therefore, an amount of the foreign matters which pass through the auxiliary seal lip and reach the seal lip close to the external space can be suppressed to be extremely small. That is, even when a permeating speed or the momentum of the foreign matters such as the muddy water passing through the labyrinth seal is high, there is no possibility that the foreign matters may strike the auxiliary seal lip while maintaining the momentum. Therefore, even when the foreign matters adhere to the auxiliary seal lip and the sealing performance is degraded by the auxiliary seal lip, the amount of the foreign matters reaching the seal lip close to the external space can still be suppressed to be small. For this reason, a considerable time is required until a large amount of foreign matters adheres to the seal lip close to the external space to such an extent as to degrade the sealing performance of the seal lip close to the external space. As a result, it is possible to sufficiently improve the durability of the rolling bearing unit with the combination seal ring.

MODES FOR CARRYING OUT THE INVENTION

[First Embodiment]

Figure 1:
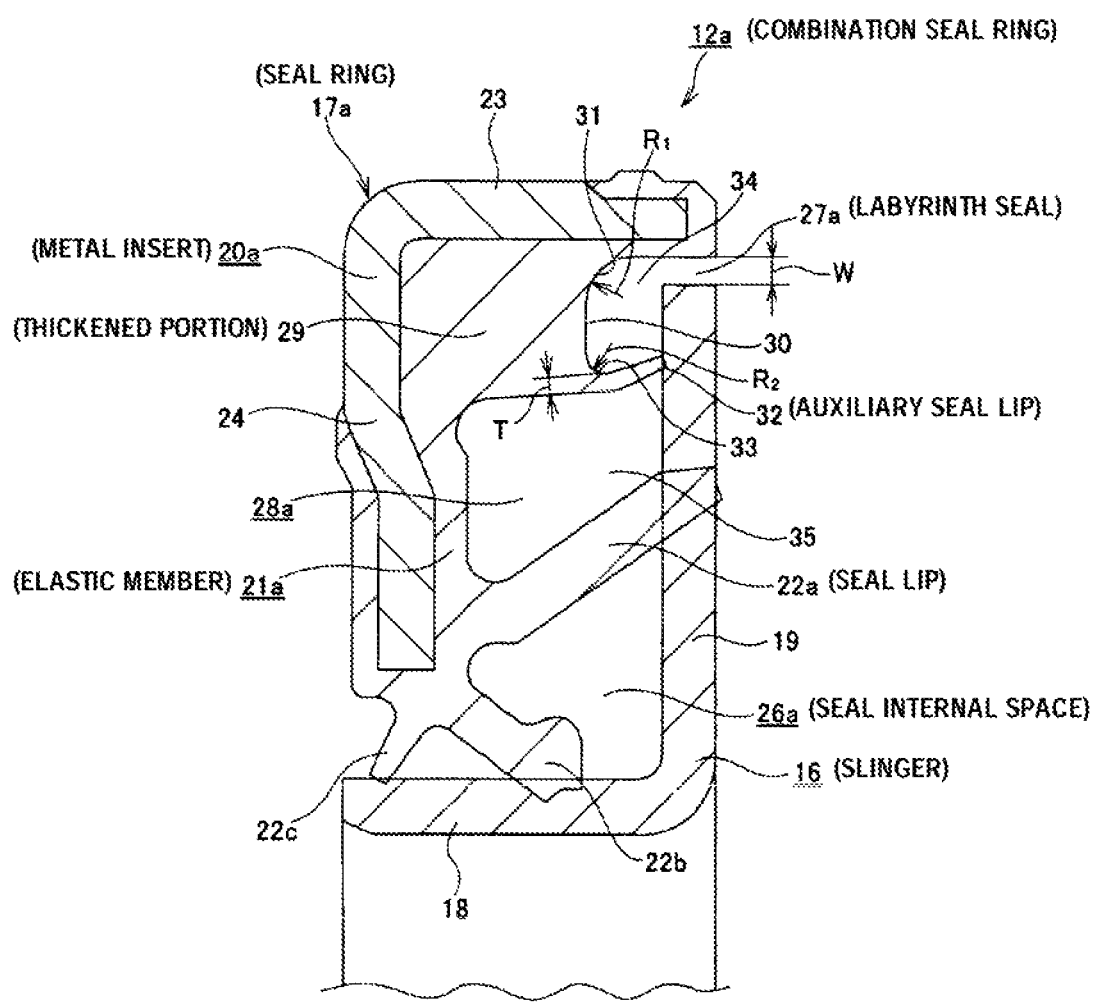
FIG. 1 is a partial cross-sectional view of a combination seal ring illustrating a first embodiment of the present invention in a free state of respective seal lips.
Figure 18:
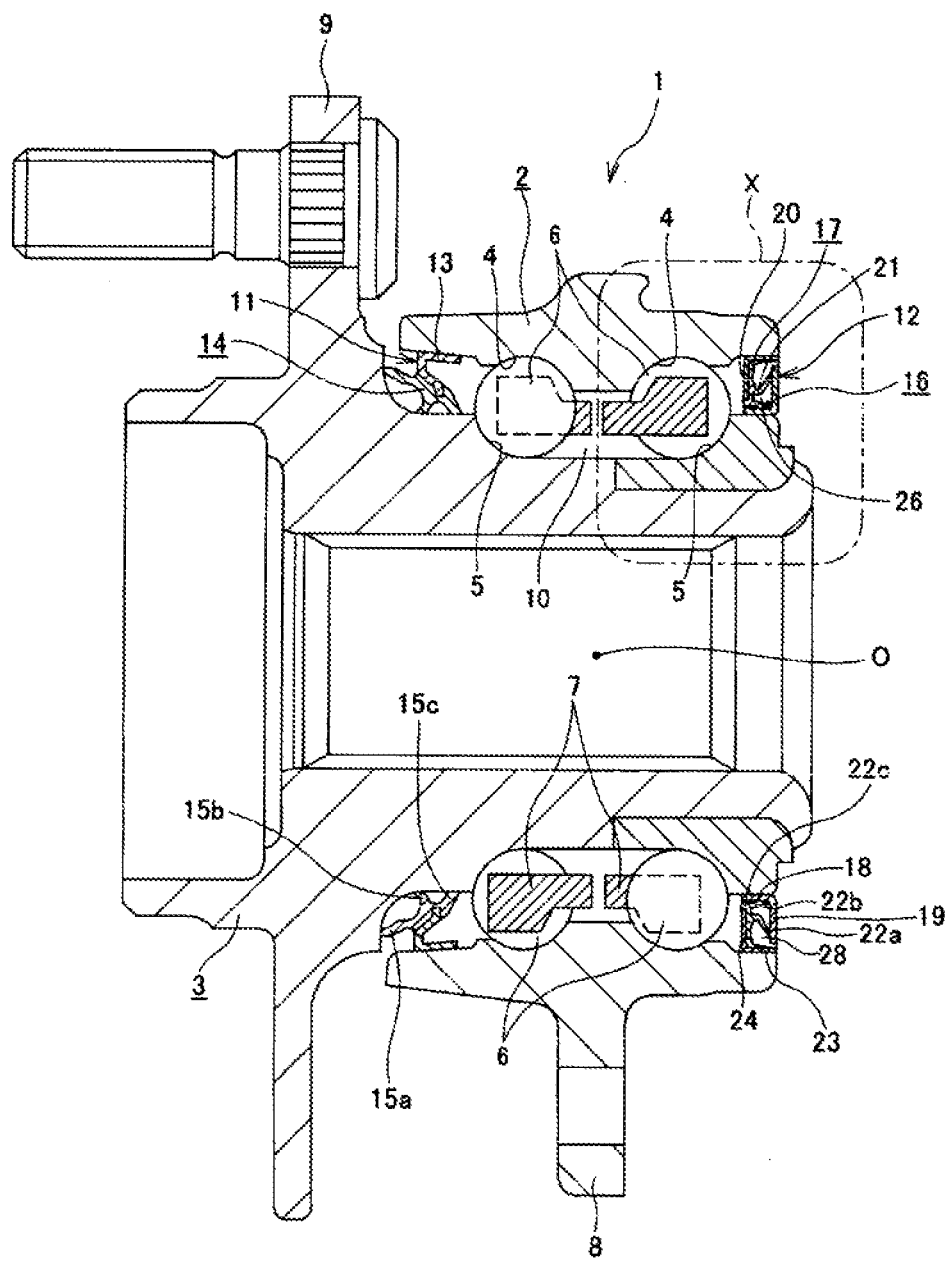
FIG. 18 is a cross-sectional view illustrating an example of a rolling bearing unit with a combination seal ring which has been known in the related art.
Figure 19A:
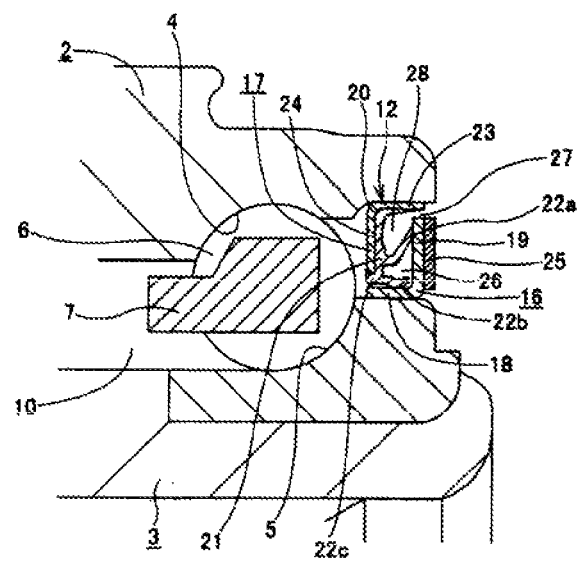
FIG. 19A is an enlarged view of an X-portion in FIG. 18, similarly illustrating an example of a combination seal ring.
Figure 19B:
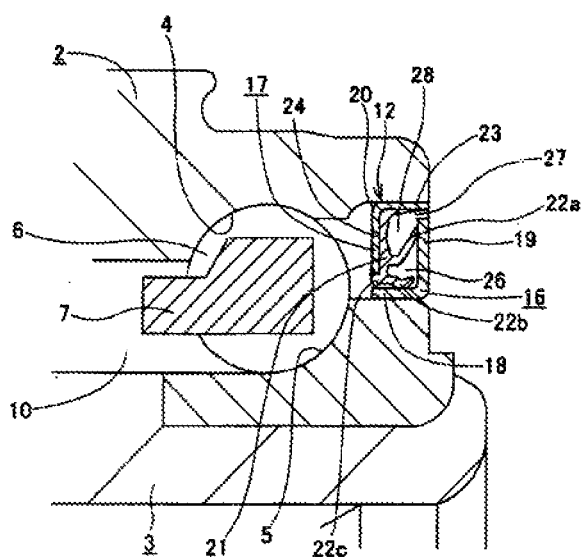
FIG. 19B is an enlarged view of an X-portion in FIG. 18, similarly illustrating another example of a combination seal ring.

FIG. 1 illustrates a first embodiment of the present invention. A characteristic of a rolling bearing unit with a combination seal ring of the present invention including the present embodiment is a structure for satisfactorily maintaining sealing performance of the combination seal ring for a long period of time in such a manner that in addition to multiple seal lips disposed in an elastic member, an auxiliary seal lip whose rigidity is lower than that of respective seal lips is disposed in the elastic member configuring the seal ring so as to prevent foreign matters from permeating a seal internal space of the combination seal ring and so as to prevent the foreign matters from adhering to a seal lip close to an external space within the respective seal lips. A configuration and an operation of the other portions are the same as those of various rolling bearing units which have been known in the related art in order to rotatably support wheels with respect to a suspension device, for example, including the above-described rolling bearing unit 1 illustrated in FIG. 18. Therefore, repeated illustration and description will be omitted or simplified. Hereinafter, characteristic parts of the present embodiment will be mainly described.

In a combination seal ring 12a to be incorporated in the rolling bearing unit with the combination seal ring of the present embodiment, a labyrinth seal 27a is disposed between an outer peripheral edge of a rotary side annular portion 19 configuring a slinger 16 and an inner peripheral surface of a portion of an elastic member 21a covering an inner peripheral surface of a stationary side cylindrical portion 23 configuring a metal insert 20a of a seal ring 17a. In addition, a thickened portion 29 whose radial and axial thickness dimension is larger than a thickness dimension of other portions is disposed in a portion, within a portion of the elastic member 21a, where a radially outside and an axially outside are partitioned by an inner peripheral surface of the stationary side cylindrical portion 23 and an outer diameter side half portion of an axial inner side surface of the stationary side annular portion 24 configuring the metal insert 20a together with stationary side cylindrical portion 23. Within the elastic member 21a, an annular stepped surface 30 which is an inboard end surface of the thickened portion 29 and a portion covering a portion close to a distal end (inboard half portion) of the inner peripheral surface of the stationary side cylindrical portion 23 are formed smoothly and continuously by an outer diameter side curved surface 31 (corner R) whose cross-sectional shape is a quarter arcuate shape. A radius of curvature $R_1$ of the cross-sectional shape of the outer diameter side curved surface 31 is set to be a radial width dimension W of the labyrinth seal 27a or larger ($R_1 \geq W$). In this manner, the foreign matters permeating a space portion present on an outer side of an auxiliary seal lip 32 (to be subsequently described) through the labyrinth seal 27a is likely to be refluxed to the labyrinth seal 27a side.

In addition, the auxiliary seal lip 32 is extended from a radially inner end portion of the stepped surface 30 toward the rotary side annular portion 19 (is integrally formed in the elastic member 21a together with the respective seal lips 22a to 22c). In addition, the auxiliary seal lip 32 has a partially conical tubular shape which extends to be flared and tilted in a direction where a diameter increases axially inward by using the stepped surface 30 as a proximal end. An outer peripheral surface of a proximal end portion of this auxiliary seal lip 32 and the stepped surface 30 are also formed smoothly and continuously by an inner diameter side curved surface 33 whose cross-sectional shape is a quarter arcuate shape. A radius of curvature $R_2$ of the cross-sectional shape of the inner diameter side curved surface 33 is appropriately regulated in view of facilitating appropriate deflection of the auxiliary seal lip 32 while suppressing stress applied to the proximal end portion of the auxiliary seal lip 32, and furthermore in view of facilitating the reflux of the foreign matters permeating the space portion present on the outer diameter side of the auxiliary seal lip 32 through the labyrinth seal 27a to the labyrinth seal 27a side. Therefore, the radius of curvature $R_2$ of the cross-sectional shape of the inner diameter side curved surface 33 is set to be the same as a thickness T of the proximal end portion of the auxiliary seal lip 32, or is set to be slightly larger than the thickness T ($R_2 \geq T$).

The above-described auxiliary seal lip 32 has a function of preventing the foreign matters from adhering to the seal lip 22a which is the seal lip close to the external space which is present on the inner diameter side of the auxiliary seal lip 32, is called a side lip and is disclosed in the scope of claims, and thus does not require a high degree of sealing performance. Rather than this, it is important to prevent an increase in drag torque (rotational dynamic torque) of the rolling bearing unit with the combination seal ring in which the combination seal ring 12a is incorporated by disposing the auxiliary seal lip 32. Therefore, in a case of the present embodiment, the following methods described in (1) to (3) prevent the increase in frictional resistance based on a fact that the auxiliary seal lip 32 is provided.

(1) The cross-sectional shape of the auxiliary seal lip 32 is set to have a wedge shape whose thickness dimension decreases as it goes toward the distal end edge.

In this manner, the distal end portion of the auxiliary seal lip 32 is suppressed to have low elasticity, and thus the frictional resistance is not increased.

(2) The thickness dimension of the auxiliary seal lip 32 is set to be sufficiently smaller than the thickness dimension of the seal lip 22a. Specifically, the thickness dimension of the proximal end portion which is the thickest portion within the auxiliary seal lip 32 is set to be one half or less of the thickness dimension of the proximal end portion which is the thinnest portion within the seal lip 22a, and more preferably one third or less. However, in view of moldability, the thickness dimension is set to be one fifth or more.

In this manner, the auxiliary seal lip 32 is suppressed to have low elasticity overall, and thus the frictional resistance is not increased.

(3) In a state where the seal ring 17a and the slinger 16 are combined with each other, interference of the auxiliary seal lip 32 is set to be sufficiently smaller than interference of the seal lip 22a. Specifically, in a free state illustrated in FIG. 1, an axial height of the auxiliary seal lip 32 (amount of axially projecting toward the rotary side annular portion 19) is set to be sufficiently lower than an axial height of the seal lip 22a.

In this manner, in the state where the seal ring 17a and the slinger 16 are combined with each other, an elastic deformation amount (axially compressed amount) of the auxiliary seal lip 32 is set to be sufficiently smaller than an elastic deformation amount of the seal lip 22a. A surface pressure of a sliding contact portion between the distal end edge of the auxiliary seal lip 32 and the outboard side surface of the rotary side annular portion 19 is suppressed, and thus the frictional resistance is not increased.

As described above, the auxiliary seal lip 32 does not require a high degree of sealing performance. Accordingly, in a state where a central axis of the seal ring 17a and a central axis of the slinger 16 are tilted due to turning of a vehicle, the distal end edge of the auxiliary seal lip 32 may be slightly lifted up from the outboard side surface of the rotary side annular portion 19 (the interference may be zero, or there may be a slight clearance). In addition, for example, in a semi-floating suspension device (non-independent suspension device), and moreover, as in a rolling bearing unit for supporting wheels which is incorporated in a portion for rotatably supporting a rear wheel (rigid rear axle) which is not provided with a steering angle, in a case where the central axis of the seal ring and the central axis of the slinger are hardly tilted even during the turning, the distal end edge of the auxiliary seal lip may be caused to oppose the outboard side surface of the rotary side annular portion over the entire periphery via a minute clearance.

In any case, a space close to an outside 28a which is present in a portion closer to the radially outer side than the seal lip 22a and communicates with the external space via the labyrinth seal 27a is radially divided into two by the auxiliary seal lip 32. Then, the auxiliary seal lip 32 is present between the seal lip 22a and the labyrinth seal 27a. In other words, a small space close to an opening 34 where an outboard end portion and an inner diameter side are partitioned by the stepped surface 30 and the auxiliary seal lip 32 is disposed in a portion communicating with the labyrinth seal 27a within a radially outer end portion of the space close to the outside 28a. Both inner and outer peripheral edge portions of the stepped surface 30 which configure an inner surface of the outboard end portion of the small space close to the opening 34 are formed smoothly and continuously with both inner and outer peripheral surfaces of the small space close to the opening 34 by both outer diameter side curved surfaces 33 and 31. Furthermore, the outer peripheral surface of the auxiliary seal lip 32 which is continuous from the inner diameter side curved surface 33 is tilted toward the distal end in a direction toward the labyrinth seal 27a. According to this configuration, by changing the flow of the foreign matters which are vigorously blown from the labyrinth seal 27a into the small space close to the opening 34, the foreign matters are refluxed toward the labyrinth seal 27a.

According to the rolling bearing unit with the combination seal ring of the present embodiment in which the combination seal ring 12a configured as described above is incorporated, it is possible to effectively prevent the foreign matters such as the muddy water from permeating the seal internal space 26a present between the slinger 16 and the seal ring 17a. In particular, according to the structure of the present embodiment, it is possible to prevent the sealing performance of the seal lip 22a from being degraded since the foreign matters adhere to the outer peripheral surface of the seal lip 22a present in the portion closest to the labyrinth seal 27a out of the respective seal lips 22a to 22c and thus the movement of the seal lip 22a is hindered. That is, according to the structure of the present embodiment, the labyrinth seal 27a, and the stepped surface 30 and the auxiliary seal lip 32 which divide the outboard end surface and the inner peripheral surface of the small space close to the opening 34 suppress the foreign matters so as not to permeate the inside of a small space close to the opposite side to the opening 35 which is present on the further inner diameter side than the auxiliary seal lip 32 within the space close to outside 28a. Hereinafter, this point will be described.

Even if the foreign matters such as the muddy water vigorously passes through the labyrinth seal 27a in the axial direction and permeates the inside of the small space close to the opening 34, the momentum of the foreign matters is weakened inside the small space close to the opening 34. Accordingly, there is no possibility that the foreign matters may strike the outer peripheral surface of the auxiliary seal lip 32. That is, the foreign matters vigorously permeating the inside of the small space close to the opening 34 from the labyrinth seal 27a are caused to flow along the outer diameter side curved surface 31, the stepped surface 30 and the inner diameter side curved surface 33, and reach the outer peripheral surface of the auxiliary seal lip 32 while the momentum is weakened. Therefore, it is possible to prevent the auxiliary seal lip 32 from being deformed due to the foreign matters vigorously permeating the inside of the small space close to the opening 34 from the labyrinth seal 27a.

Figure 2:
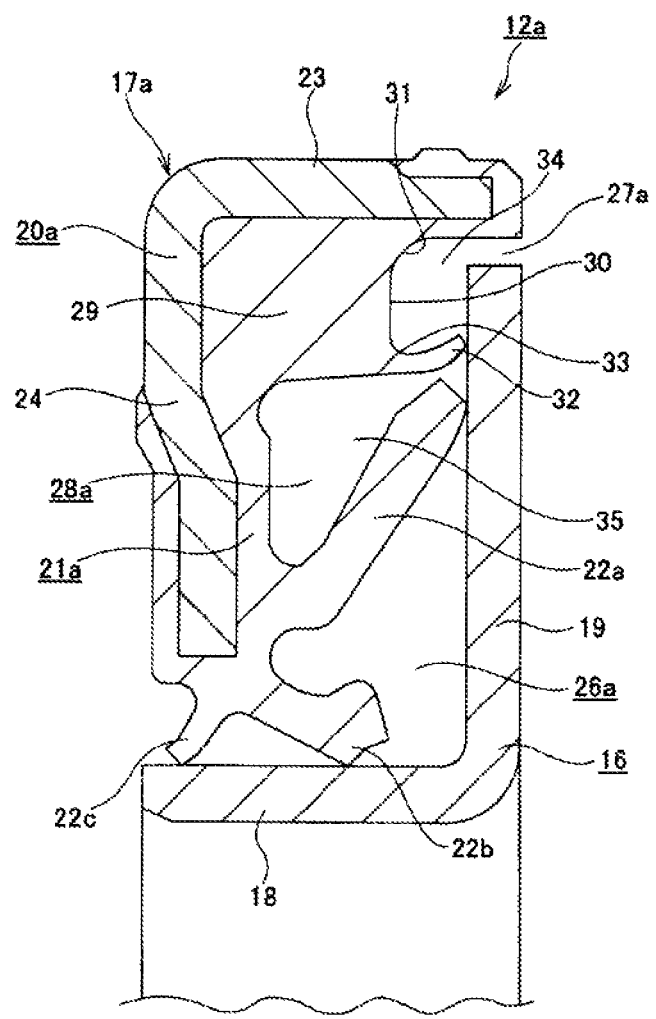
FIG. 2 is similarly a partial cross-sectional view illustrating a state where the respective seal lips are elastically deformed after being combined with a slinger.

Moreover, in a case of the present embodiment, in a used state illustrated in FIG. 2, the distal end portion of the seal lip 22a is caused to closely oppose the inner peripheral surface of the auxiliary seal lip 32. Accordingly, even when a certain pressure is applied to the outer peripheral surface of the auxiliary seal lip 32, there is no possibility that the auxiliary seal lip 32 is deformed to be inverted (turned over) to the inner diameter side. That is, if the muddy water permeating after passing through the labyrinth seal 27a increases the pressure inside the small space close to the opening 34, the auxiliary seal lip 32 is likely to be deformed to the inner diameter side. However, the distal end portion of the seal lip 22a comes into contact with the inner peripheral surface of the auxiliary seal lip 32 to support the auxiliary seal lip 32, thereby preventing the auxiliary seal lip 32 from being deformed. In this manner, it is possible to maintain a stable state for the sealing performance of the auxiliary seal lip 32.

As described above, regardless of the foreign matters permeating the inside of the small space close to the opening 34, there is no possibility that the auxiliary seal lip 32 may be largely deformed radially inward. Accordingly, there is no possibility that the foreign matters may pass through the auxiliary seal lip 32 and may permeate the inside of the small space close to the opposite side of the opening 35. In other words, the foreign matters permeating the inside of the small space close to the opening 34 are blocked inside the small space close to the opening 34. Furthermore, the foreign matters which are guided by the outer diameter side curved surface 31, the stepped surface 30 and the inner diameter side curved surface 33 and reach the outer peripheral surface of the auxiliary seal lip 32 are caused to flow radially outward on the outer peripheral surface of the auxiliary seal lip 32 toward the labyrinth seal 27a, and are discharged to the external space through the labyrinth seal 27a. In the meantime, the foreign matters (muddy water containing a large amount of moisture) clean the inside of the small space close to the opening 34, thereby preventing solid materials from being deposited inside the small space close to the opening 34. Therefore, it is possible to prevent the movement of the seal lip 22a from being hindered by a large amount of solid portions adhering to the seal lip 22a. As a result, over a long period of time, it is possible to satisfactorily maintain not only an advantageous effect that the auxiliary seal lip 32 prevents the foreign matters from permeating the small space close to the opposite side of the opening 35 side, but also an advantageous effect that the auxiliary seal lip 32 prevents the foreign matters from adhering to the seal lip 22a. Accordingly, it is possible to ensure the durability of the rolling bearing unit in which the combination seal ring 12a is incorporated.

In addition, in the rolling bearing unit with the combination seal ring for supporting wheels, during a vehicle's travelling on a rough road or a vehicle's turning, the outer ring to which the seal ring 17a is internally fitted and fixed and the hub to which the slinger 16 is externally fitted and fixed are relatively displaced. Based on this, the seal ring 17a and the slinger 16 are relatively displaced, thereby increasing and decreasing a volume of the small space close to the opening 34. In the case of the present embodiment, the volume of the small space close to the opening 34 is smaller than the volume of the small space close to the opposite side of the opening 35. Moreover, a distance is also great from a center O (refer to FIG. 18) of the relative displacement between the outer ring 2 and the hub 3 which serves as a swing center. Accordingly, a volume change rate of the small space close to the opening 34 due to the relative displacement is high. Therefore, a pumping operation using the volume change can be increased, and thus, the foreign matters deposited inside the small space close to the opening 34 can be effectively discharged to the external space. In a case where the auxiliary seal lip 32 is a contact-type seal lip, during the pumping operation, air sealed inside the small space close to the opposite side of the opening 35 supports the auxiliary seal lip 32. Accordingly, there is no possibility that the foreign matters deposited inside the small space close to the opening 34 may permeate the inside of the small space close to the opposite side of the opening 35. In addition, even in a case where the auxiliary seal lip 32 is a non-contact-type seal lip having a minute clearance, the air present inside the small space close to the opposite side of the opening 35 flows radially outward from the distal end portion of the auxiliary seal lip 32. Therefore, there is no possibility that the foreign matters deposited inside the small space close to the opening 34 may permeate the inside of the small space close to the opposite side of the opening 35.

In addition, a portion which partitions the outer diameter side of the small space close to the opposite side of the opening 35 within the inner peripheral surface of the thickened portion 29 of the elastic member 21a is a partially conical-shaped concave surface which is configured to have a larger diameter toward the auxiliary seal lip 32 as it goes axially inward. Therefore, if the foreign matters such as the muddy water pass a portion between the distal end edge of the auxiliary seal lip 32 and the inboard side surface of the slinger 16 and permeate the inside of the small space close to the opposite side of the opening 35, the foreign matters are guided, along the inner peripheral surface of the thickened portion 29, to a sliding contact portion or a closely opposing portion between the auxiliary seal lip 32 and the slinger 16. Then, the auxiliary seal lip 32 has small interference, is thinned and is tilted radially outward as it goes toward the distal end edge. Accordingly, a sealing effect is weak in blocking a fluid flowing from the small space close to the opposite side of the opening 35 toward the small space close to the opening 34. Therefore, the foreign matters guided, along the inner peripheral surface of the thickened portion 29, to the inner peripheral surface of the auxiliary seal lip 32 are caused to pass the sliding contact portion or the closely opposing portion between auxiliary seal lip 32 and the slinger 16 from the radially inner side to the radially outer side, are fed to the small space close to the opening 34, are further caused to pass the labyrinth seal 27a, and are discharged to the external space.

As described above, the structure of the present embodiment is provided with the auxiliary seal lip 32 so as to greatly reduce the foreign matters which reach the outer peripheral surface of the seal lip 22a and remain adhering to the outer peripheral surface of the seal lip 22a. The auxiliary seal lip 32 provided in order to obtain such operation and effect is thin, and has negligible or zero interference. Therefore, the increase in the rotational torque of the rolling bearing unit with the combination seal ring due to the addition of the auxiliary seal lip 32 is zero or negligible.

The radial width dimension W of the labyrinth seal 27a disposed between the outer peripheral edge of the rotary side annular portion 19 and the inner peripheral surface of the stationary side cylindrical portion 23 is set so as to come into slight contact with each other in the maximum value of the relative tilting between the outer ring and the hub which is assumed in design. The inner peripheral surface of the stationary side cylindrical portion 23 is covered by the elastic member 21a. Accordingly, even when the setting is performed as described above, there is no possibility that the setting may cause serious damage to the combination seal ring 12a. Then, the width dimension W is set to be the minimum so as to improve the sealing performance of the labyrinth seal 27a. In this manner, it is possible to minimize the foreign matters permeating the small space close to the opening 34.

[Second Embodiment]

Figure 3:
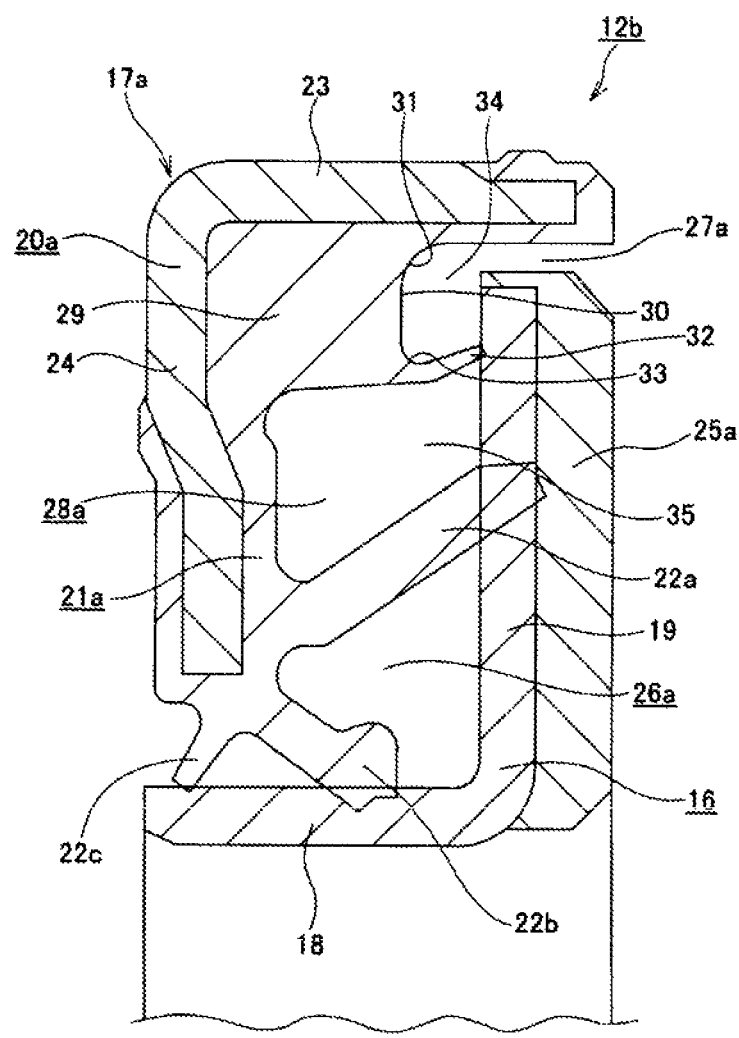
FIG. 3 illustrates a second embodiment of the present invention, and is similar to FIG. 1.

FIG. 3 illustrates a second embodiment. In a case of the present embodiment, an encoder 25a made of a permanent magnet which is formed in an overall annular shape by dispersing magnetic powder in a high polymer material such as rubber and synthetic resin is fixedly attached to an inboard side surface of the rotary side annular portion 19 configuring the slinger 16 over the entire periphery. The encoder 25a is formed so as to cover a distal end side peripheral edge (outer peripheral edge) of the rotary side annular portion 19, and configures the labyrinth seal 27a between the encoder 25a and (a portion of the elastic member 21a covered by) the inner peripheral surface of the stationary side cylindrical portion 23 configuring the metal insert 20a of the seal ring 17a. In addition, as an elastomer configuring the elastic member 21a of the seal ring 17a, those which contain a wax component and have excellent water repellency are used.

According to the above-described structure of a combination seal ring 12b of the present embodiment, an axial length of the labyrinth seal 27a can be lengthened in width by an amount of the thickness of the encoder 25a. Accordingly, it is possible to improve the sealing effect. Furthermore, the distal end side peripheral edge (outer peripheral edge) of the rotary side annular portion 19 which is a shearing surface is covered by the encoder 25a so as to improve surface roughness, thereby providing a smooth surface. Accordingly, it is possible to prevent the mud from being deposited by being caught on the inner surface portion of the labyrinth seal 27a. In addition, when forming the encoder 25a on the inboard side surface of the rotary side annular portion 19 by way of molding, it is possible to set the outboard side surface of the rotary side annular portion 19 to be a reference surface (surface against which a bottom surface of molds is pressed). Therefore, it is possible to prevent the high polymer material configuring the encoder 25a from adhering to the outboard side surface on which the auxiliary seal lip 32 and the seal lip 22a are in sliding contact with each other. In addition, the water repellency of the elastic member 21a is excellent. Accordingly, the space close to the outside 28a including the inner surface of the small space close to the opening 34 are configured to have the smooth surface of the elastic member 21a, thereby more sufficiently preventing the foreign matters from being deposited on the surface of the auxiliary seal lip 32 and the seal lip 22a.

The configuration and the operation of the other elements are the same as those in the above-described first embodiment. Therefore, the same reference numerals are given to the same elements, and repeated description will be omitted.

[Third Embodiment]

Figure 4:
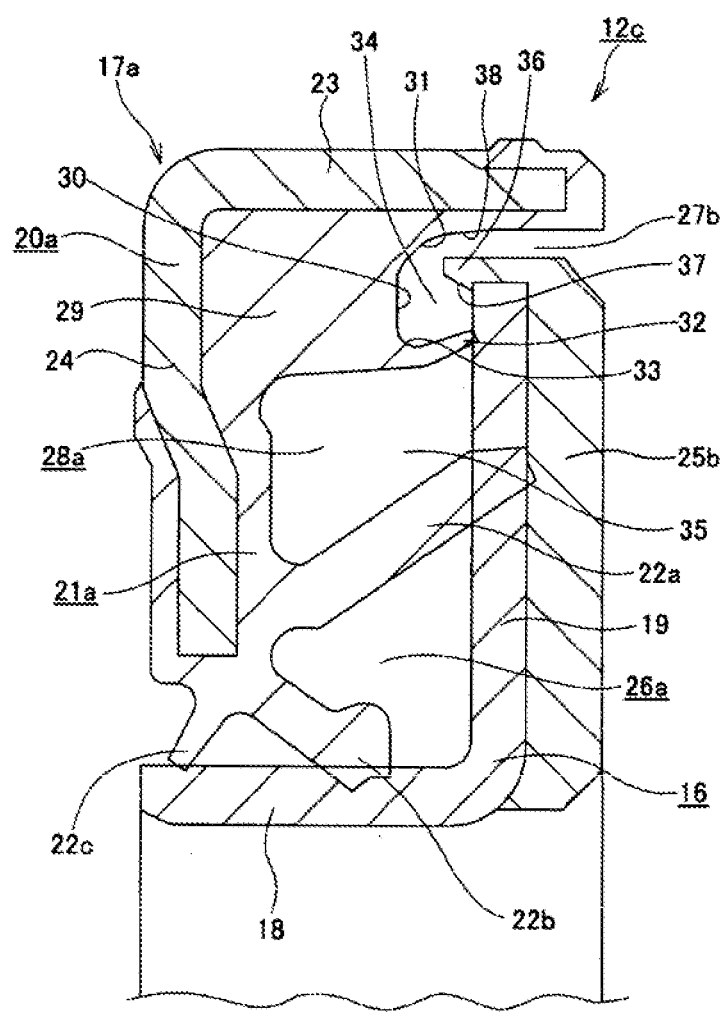
FIG. 4 illustrates a third embodiment of the present invention, and is similar to FIG. 1.

FIG. 4 illustrates a third embodiment of the present embodiment. In a case of the present embodiment, an encoder 25b made of a permanent magnet is also fixedly attached to the inboard side surface of the rotary side annular portion 19 configuring the slinger 16 over the entire periphery. In a case of the present embodiment, an annular projection 36 is formed by causing a portion of the high polymer material configuring the encoder 25b to cross over the outer peripheral edge of the rotary side annular portion 19 and to project toward the stationary side annular portion 24 configuring the metal insert 20a of the seal ring 17a over the entire periphery. The inner peripheral surface of the projection 36 is a tilted surface 37 having a partially conical surface shape, which is tilted in a direction where the inner diameter increases as it goes toward the distal end side (as it goes outboard). Then, a labyrinth seal 27b is provided by including a portion between the outer peripheral surface of the projection 36 and the inner peripheral surface of the stationary side cylindrical portion 23. In addition, in a case of the structure of the present embodiment, a portion of the elastic member 21a configuring the seal ring 17a covers the inner peripheral surface of the stationary side cylindrical portion 23 configuring the metal insert 20a, and a portion for forming the labyrinth seal 27b by causing the outer end edge of the encoder 25b and the outer peripheral surface of the projection 36 to closely oppose each other is a tilted surface 38 having a partially conical surface shape which is tilted in a direction where the inner diameter decreases as it goes toward the stationary side annular portion 24 side.

According to the above-described structure of a combination seal ring 12c of the present embodiment, an axial length of the labyrinth seal 27b can be further lengthened in width by an amount of the axial height of the projection 36 as compared to the second embodiment. Accordingly, it is possible to further improve the sealing effect. Furthermore, the projection 36 is caused to project so as to cover the sliding contact portion or the closely opposing portion between the auxiliary seal lip 32 and the outboard side surface of the rotary side annular portion 19. Therefore, it is possible to more reliably prevent spray of the muddy water splattered by wheels from vigorously colliding with the sliding contact portion or the closely opposing portion.

In addition, the inner peripheral surface of the stationary side cylindrical portion 23 is adapted to be the tilted surface 38, and the inner peripheral surface of the projection 36 is also adapted to be the tilted surface 37. In this manner, it is possible to more effectively prevent the foreign matters such as the muddy water from being deposited on the inner surface of the small space close to the opening 34. That is, the foreign matters adhering to the tilted surface 37 of the inner peripheral surface of the projection 36 are discharged by centrifugal force based on the rotation of the slinger 16, and the foreign matters adhering to the tilted surface 38 of a portion of the elastic member 21a are pulled by the foreign matters fed by the centrifugal force. Both of the foreign matters tend to be discharged to the external space through the labyrinth seal 27b, thereby preventing the foreign matters from being deposited as described above.

Furthermore, if fluororesin such as polytetrafluoroethylene resin (PTFE), polyphenylene sulfide resin (PPS), modified polyamide resin, and the like which have excellent water repellency are used as the high polymer material configuring the encoder 25b, it is possible to further improve the effect of preventing the foreign matters such as mud from being deposited.

The configuration and the operation of the other elements are the same as those in the above-described second embodiment. Therefore, the same reference numerals are given to the same elements, and repeated description will be omitted.

[Fourth Embodiment]

Figure 5:
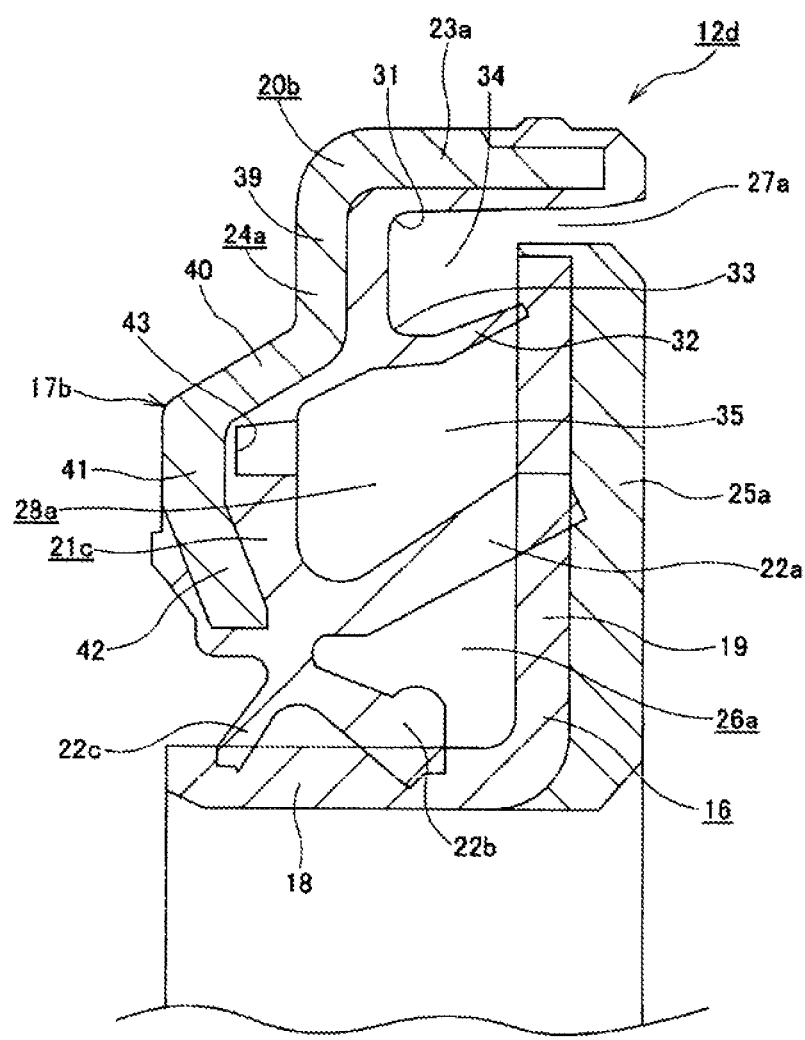
FIG. 5 illustrates a fourth embodiment of the present invention, and is similar to FIG. 1.

FIG. 5 illustrates a fourth embodiment of the present invention. In a case of a combination seal ring 12d which is incorporated in the rolling bearing unit with the combination seal ring of the present embodiment, the stationary side annular portion 24a configuring the seal ring 17b has a stepped shape which is configured to have a proximal end side annular portion 39, an outer diameter side tilted portion 40, a distal end side annular portion 41, and an inner diameter side tilted portion 42 which are arranged concentrically with each other. The proximal end side annular portion 39 is present closest to the outer diameter, and is bent at a right angle, radially inward from an outboard end portion of a stationary side cylindrical portion 23a. In addition, the outer diameter side tilted portion 40 is continuously formed radially inward from the inner peripheral edge which is the distal end side peripheral edge of the proximal end side annular portion 39, within a portion corresponding to the tilted portion disclosed in the scope of claims, and is tilted in an axially outward direction as it goes toward the inner peripheral edge side which is the distal end side. In addition, the distal end side annular portion 41 is parallel to the proximal end side annular portion 39 in a portion which is continuously formed radially inward from the inner peripheral edge of the outer diameter side tilted portion 40. Furthermore, in order to support the proximal end portion of the respective seal lips 22a, 22b and 22c, the inner diameter side tilted portion 42 is tilted in an axially inward direction as it goes toward the inner peripheral edge side which is the distal end side within a portion continuously formed radially inward from the inner peripheral edge of the distal end side annular portion 41.

Then, the proximal end portion of the auxiliary seal lip 32 formed in a portion of an elastic member 21c is positioned in the inner peripheral edge portion (distal end side portion) of the proximal end side annular portion 39. Then, the thickness dimension of a portion with which the proximal end portion of the auxiliary seal lip 32 is continuously formed within the elastic member 21c is set to substantially coincide with the thickness dimension of the proximal end portion of the auxiliary seal lip 32 (on the basis of the larger one, the difference is set to be within 40%, preferably within 20%). In this manner, the present embodiment intends to improve the sealing performance between the distal end edge of the auxiliary seal lip 32 and the outboard side surface of the rotary side annular portion 19 configuring the slinger 16. That is, the thickness dimension of the portion with which the proximal end portion of the auxiliary seal lip 32 is continuously formed within the elastic member 21c is set to be thinner than that of the case of the first to third embodiments (the thickened portion 29 is eliminated). Then, during the molding of the elastic member 21c, a shrinking amount is suppressed in the portion with which the proximal end portion of the auxiliary seal lip 32 is continuously formed. After the molding, distortion of the shape of the auxiliary seal lip 32 is suppressed to a minimum as much as possible.

That is, a rubber material configuring the elastic member 21c shrinks by an amount of 1.2% to 3.5% after the molding. A so-called shrinkage shrink mark is formed. Therefore, if the proximal end portion of the auxiliary seal lip 32 is positioned in the portion of the thickened portion 29 as in the first to third embodiments, there is a possibility that the shape of the auxiliary seal lip 32 may be distorted due to the influence of the shrinkage hole of the thickened portion 29. Then, when distorted, a state of an engagement portion between the distal end edge of the auxiliary seal lip 32 and the outboard side surface of the rotary side annular portion 19 of the slinger 16 becomes unstable, and thus the sealing performance of the engagement portion is likely to be unstable. Specifically, a tilting angle of the auxiliary seal lip 32 with respect to the central axis of the seal ring 17b becomes small (the auxiliary seal lip 32 is erected), and the distal end edge of the auxiliary seal lip 32 is likely to be in a state of so-called belly abutting where the distal end edge of the auxiliary seal lip 32 is largely bent and then comes into contact with the outboard side surface of the rotary side annular portion 19 in a wide area. Consequently, the stable sealing performance cannot be easily obtained. If the thickened portion 29 is simply eliminated and the auxiliary seal lip is lengthened by that amount, the rigidity of the auxiliary seal lip is excessively lowered, and thus, the stable sealing performance cannot also be obtained. Moreover, the volume of the small space close to the opening 34 increases, and the above-described effect of discharging the foreign matters by using the pumping operation is degraded. If the thickness of the auxiliary seal lip is increased by the lengthened amount of the auxiliary seal lip in order to ensure the required rigidity, the surface pressure of the engagement portion between the distal end edge of the auxiliary seal lip and the outboard side surface of the rotary side annular portion is increased, and the dynamic torque of the rolling bearing unit with the combination seal ring is increased.

In contrast, according to the structure of the present embodiment, the proximal end side annular portion 39 is present on the further inboard side than the distal end side annular portion 41 (side close to the rotary side annular portion 19). Then, by that amount, it is possible to decrease the thickness dimension of the portion with which the proximal end portion of the auxiliary seal lip 32 within the elastic member 21c without changing the respective dimensions and the respective shapes of the seal lips 22a, 22b and 22c (while maintaining the dimension and the shape which are the same as those in the first to third embodiments). As a result, it is possible to obtain satisfactory sealing performance of the engagement portion by reducing a degree of the shrinkage hole formed in the portion, by reducing the distortion of the shape of the auxiliary seal lip 32, and by stabilizing the state of the engagement portion between the distal end edge of the auxiliary seal lip 32 and the outboard side surface of the rotary side annular portion 19 of the slinger 16.

In addition, according to the structure of the present embodiment, it is possible to strengthen the rigidity of the stationary side cylindrical portion 23a by a decreased amount of the axial dimension (width) of the stationary side cylindrical portion 23a. Then, during the molding of the sealing material 21c, the stationary side cylindrical portion 23a can be made less likely to suffer elastic deformation such as buckling. Accordingly, it is possible to stably mold a portion for surrounding an inboard half portion of the stationary side cylindrical portion 23a from both inner and outer peripheral surfaces within the sealing material 21c.

The outer diameter of the distal end side annular portion 41 is set to be larger than the outer diameter in the free state of the seal lip 22a. Then, during the molding of the sealing material 21c, multiple places in the circumferential direction of an inboard side surface of a metal core 20b are pressed against a cavity inner surface of the mold by a pressing pin (not illustrated). Then, the molding for the respective seal lips 22a, 22b and 22c can be accurately performed by preventing the metal insert 20b from being lifted from the inner surface. A small recess 43 illustrated in FIG. 5 is a scratch pressing against a distal end portion of the pressing pin. However, a bottom portion of the small recess 43 is covered by a portion of the sealing material 21c. That is, during a molding process of the sealing material 21c, a pressurized rubber material enters a portion between the distal end surface of the pressing pin and the inboard side surface of the metal insert 20b. Therefore, the inboard side surface of the metal core 20b is not exposed, and thus rust prevention of the metal insert 20b is achieved.

In addition, in the structure of the present embodiment, the axial position of the inboard surface of the proximal end side annular portion 39 is set to substantially coincide with the axial position of the inboard end surface of the thickened portion 29 (refer to FIGS. 1 to 4) in the first to third embodiments. However, it is not necessary to set these axial positions to coincide with each other. The axial position can be appropriately adjusted depending on the performance such as flexibility and rigidity which are required for the auxiliary seal lip 32.

The configuration and the operation of the other elements are the same as those in the above-described second embodiment. Therefore, the same reference numerals are given to the same elements, and repeated description will be omitted.

[Fifth Embodiment]

Figure 6:
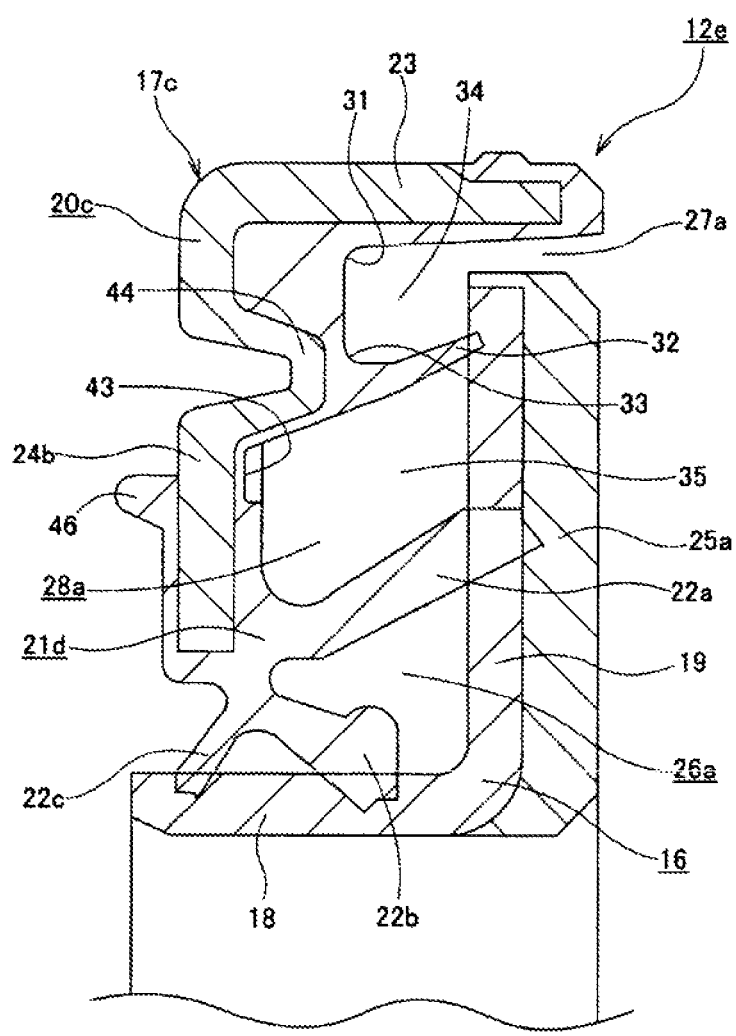
FIG. 6 illustrates a fifth embodiment of the present invention, and is similar to FIG. 1.

FIG. 6 illustrates a fifth embodiment of the present invention. In a case of a combination seal ring 12e which is incorporated in the rolling bearing unit with the combination seal ring of the present embodiment, a projection 44 is formed in a radially intermediate portion of a stationary side annular portion 24b of the metal core 20c which configures an elastic member 21d and a seal ring 17c. The projection 44 has a trapezoidal shape in cross section, and is formed over the entire periphery in a state of projecting axially inward toward the rotary side annular portion 19 of the slinger 16. Then, the proximal end portion of the auxiliary seal lip 32 is positioned in the distal end portion of the projection 44. In the case of the present embodiment, according to this configuration, the thickness of a portion positioned axially outward of the proximal end portion of the auxiliary seal lip 32 within a portion of the elastic member 21d is set to be substantially the same as the thickness of the proximal end portion of the auxiliary seal lip 32. After an intermediate material having an L-shape in cross section (material having a shape substantially the same as the metal insert 20a illustrated in FIGS. 1 to 4) is manufactured, the projection 44 is manufactured in such a manner that a flat plate portion (annular portion) of the intermediate material is strongly clamped between a die and punch and subjected to plastic deformation (bulging process is performed).

In a case of the above-described structure of the present embodiment, the axial dimension (width) of the stationary side cylindrical portion 23 present in the outer peripheral edge portion of the metal insert 20c is sufficiently ensured. In this manner, it is possible to prevent the deformation of the auxiliary seal lip 32 while ensuring fitting strength of the metal insert 20c with respect to the outer ring and stabilizing a post-fitting posture.

In addition, in the case of the structure of the present embodiment, in order to prevent the metal insert 20c from being lifted from the cavity inner surface by using the pressing pin, the inner diameter of the projection 44 is also set to be larger than the outer diameter in a free state of the seal lip 22a.

Furthermore, in the illustrated example, a projection 46 is formed in the radially intermediate portion of the outboard side surface of the stationary side annular portion 24b within a portion of the elastic member 21d. In a state where the combination seal ring 12e is axially overlapped and packed (straight-winding packed), the projection 46 comes into contact with a detection target surface of the encoder 25a (in a case of disposing the encoder 25a) or the inboard side surface of the rotary side annular portion 19 configuring the slinger 16 (in a case without disposing the encoder). Then, damage to the detection target surface is prevented, or the seal ring 17c of the combination seal ring 12e and the slinger 16 which are adjacent to each other are prevented from adhering to each other.

When the structure of the present embodiment is embodied, it is also possible to dispose the inner diameter side tilted portion 42 (refer to FIG. 5) as in the above-described fourth embodiment in the inner diameter side end portion of the metal insert 20c.

The configuration and the operation of the other elements are the same as those in the above-described second embodiment. Therefore, the same reference numerals are given to the same elements, and repeated description will be omitted.

[Sixth Embodiment]

Figure 7:
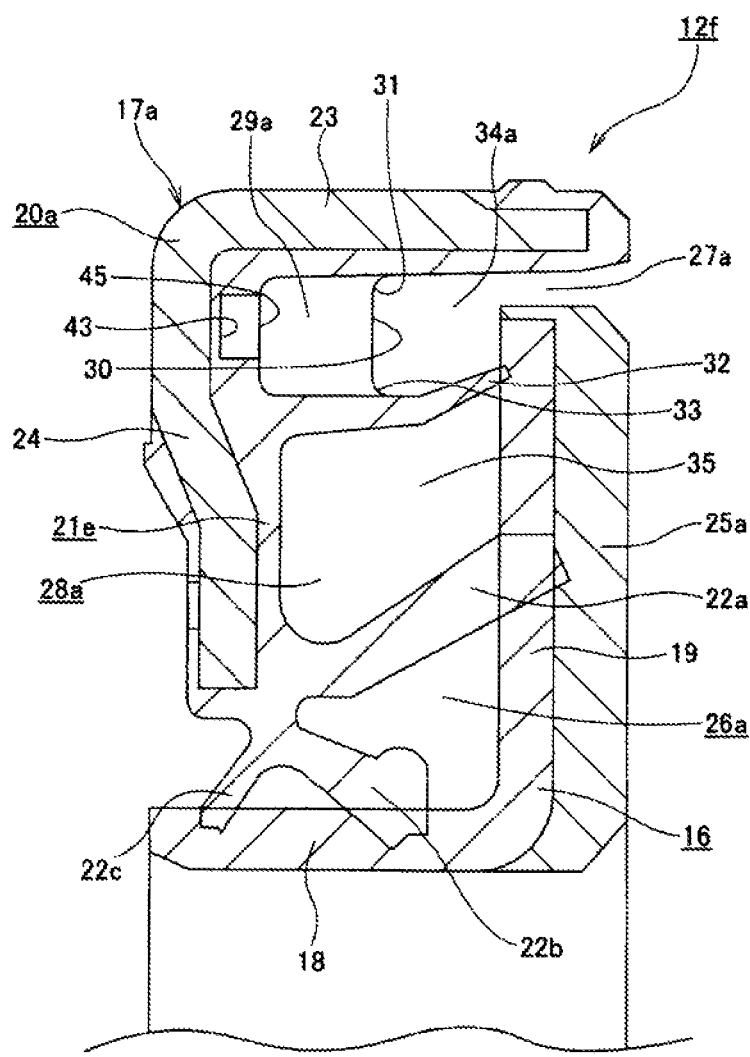
FIG. 7 illustrates a sixth embodiment of the present invention, and is similar to FIG. 1.

FIG. 7 illustrates a sixth embodiment of the present invention. In a case of a combination seal bearing 12f which is incorporated in the rolling bearing unit with the combination seal ring of the present embodiment, recesses 45 respectively opening in the inboard end surface of the thickened portion 29a are formed in multiple circumferential places of the radially intermediate portion of the thickened portion 29a disposed in a portion of an elastic member 21e. The thickness dimensions of a portion between the respective recesses 45 in the circumferential direction and the radially inner end portion of the thickened portion 29a which is positioned further radially inward than these respective recesses 45 are set to be substantially the same as the thickness dimension of the proximal end portion of the auxiliary seal lip 32. Then, the proximal end portion of the auxiliary seal lip 32 is positioned in the radially inner end portion within the inboard end surface of the thickened portion 29a.

In a case of the present embodiment as described above, it is also possible to ensure the sealing performance by preventing the auxiliary seal lip 32 from being deformed due to the shrinkage hole formed after the molding of the elastic member 21e.

In addition, in the case of the present embodiment, it is possible to increase the volume of the small space close to the opening 34a present between the auxiliary seal lip 32 and the labyrinth seal 27a by a disposed amount of the respective recesses 45. Therefore, whereas the effect of discharging the foreign matters by using the above-described pumping operation is decreased, an effect of weakening the momentum of the foreign matters permeating the inside of the small space close to the opening 34a after passing through the labyrinth seal 27a is increased. As a result, an effect of preventing the foreign matters from passing through the engagement portion between the distal end edge of the auxiliary seal lip 32 and the outboard side surface of the rotary side annular portion 19 is increased.

In the case of the present embodiment, in a rear surface portion of the respective recesses 45, the stationary side annular portion 24 of the metal insert 20 is pressed against the cavity inner surface by the pressing pin.

The configuration and the operation of the other elements are the same as those in the above-described first embodiment. Therefore, the same reference numerals are given to the same elements, and repeated description will be omitted.

[Seventh Embodiment]

Figure 8:
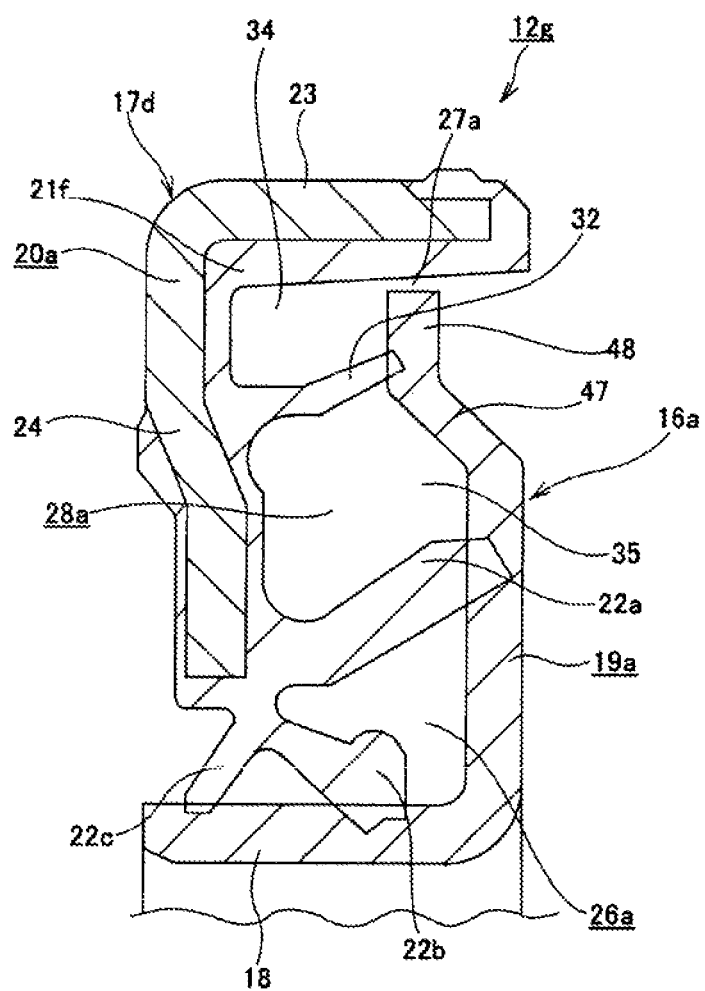
FIG. 8 illustrates a seventh embodiment of the present invention, and is similar to FIG. 1.

FIG. 8 illustrates a seventh embodiment of the present invention. In a case of a seal ring 17d configuring a combination seal bearing 12g which is incorporated in the rolling bearing unit with the combination seal ring of the present embodiment, similar to the above-described case of the fourth and fifth embodiments illustrated in FIGS. 5 and 6, the thickness dimension of the portion with which the proximal end portion of the auxiliary seal lip 32 is formed continuously within an elastic member 21f is also decreased. Then, the distortion of the shape of the auxiliary seal lip 32 is suppressed to a minimum as much as possible. However, in the case of the present embodiment, unlike the case of the fourth and fifth embodiments, the metal insert 20a having the same shape as that of the above-described case of the first to third embodiments illustrated in FIGS. 1 to 4 is used, and the entire length of the auxiliary seal lip 32 is regulated to have an appropriate value.

Therefore, in the case of the present embodiment, a portion close to a distal end of a radially intermediate portion of a rotary side annular portion 19a of a slinger 16a is formed to be bent over the entire periphery in the thickness direction of the rotary side annular portion 19a. In the case of the present embodiment, the portion close to the outer diameter of the radially intermediate portion of the rotary side annular portion 19a is bent toward the stationary side annular portion 24 of the metal insert 20a by less than 90° so as to be a tilted portion 47. Furthermore, in a state of being continuously formed radially outward from the tilted portion 47, a distal end side flat plate portion 48 is disposed. Accordingly, the distal end side flat plate portion 48 is positioned in a portion closer to the stationary side annular portion 24 than the intermediate portion or the proximal end portion within the rotary side annular portion 19a (is offset to the stationary side annular portion 24 with respect to the intermediate portion or the proximal end portion). Then, the distal end edge of the auxiliary seal lip 32 is brought into sliding contact with or is caused to closely oppose the axial side surface of the distal end side flat plate portion 48 over the entire periphery. Due to the offset distal end side flat plate portion 48, the labyrinth seal 27a disposed between the outer peripheral edge of the rotary side annular portion 19a (the distal end side flat plate portion 48) and the inner peripheral surface of a portion of the elastic member 21f which covers the inner peripheral surface of the stationary side cylindrical portion 23 is positioned further axially outward as compared to the above-described case of the first embodiment. Therefore, the foreign matters are less likely to reach the labyrinth seal 27a. In this manner, it is possible to improve the effect of preventing the foreign matters from permeating the inside of the labyrinth seal 27a.

The configuration and the operation of the other elements are the same as those in the above-described fourth and fifth embodiments. Therefore, the same reference numerals are given to the same elements, and repeated description will be omitted.

[Eighth Embodiment]

Figure 9:
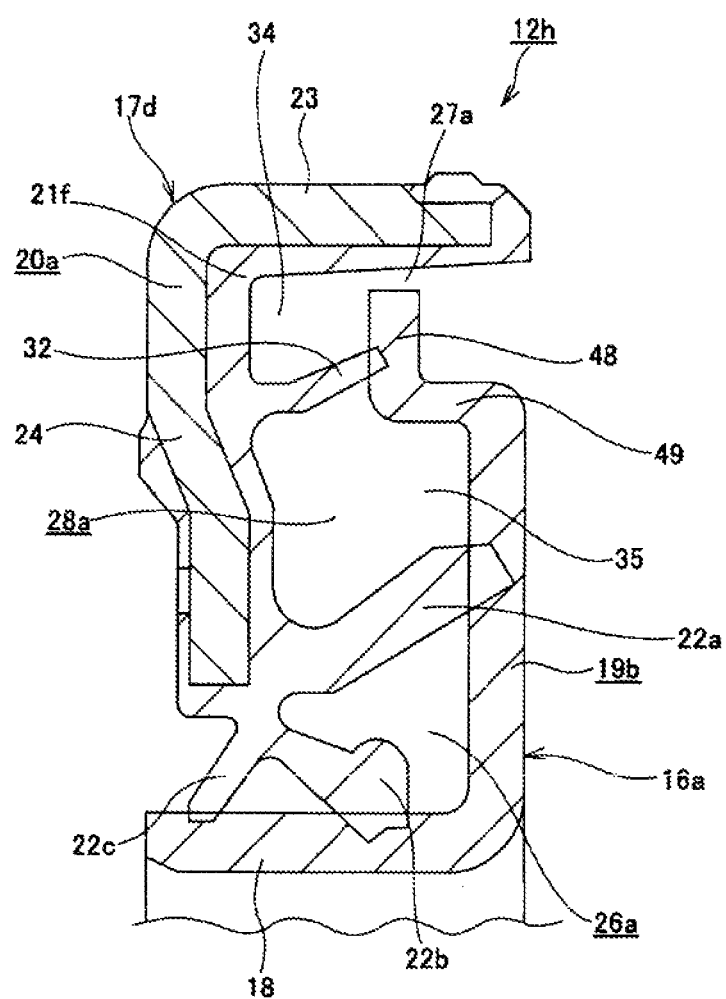
FIG. 9 illustrates an eighth embodiment of the present invention, and is similar to FIG. 1.

FIG. 9 illustrates an eighth embodiment of the present invention. In a case of a slinger 16a configuring a combination seal bearing 12h which is incorporated in the rolling bearing unit with the combination seal ring of the present embodiment, a portion close to the outer diameter of a radially intermediate portion of a rotary side annular portion 19b is bent at a right angle, toward the stationary side annular portion 24 of the metal insert 20a so as to be a short cylindrical-shaped step portion 49, and further, the distal end edge of the step portion 49 is bent radially outward at a right angle so as to dispose the distal end side flat plate portion 48. Then, the distal end edge of the auxiliary seal lip 32 is brought into sliding contact with or is caused to closely oppose the axial side surface of the distal end side flat plate portion 48 over the entire periphery.

The configuration and the operation of the other elements are the same as those in the above-described seventh embodiment. Therefore, the same reference numerals are given to the same elements, and repeated description will be omitted.

[Ninth Embodiment]

Figure 10:
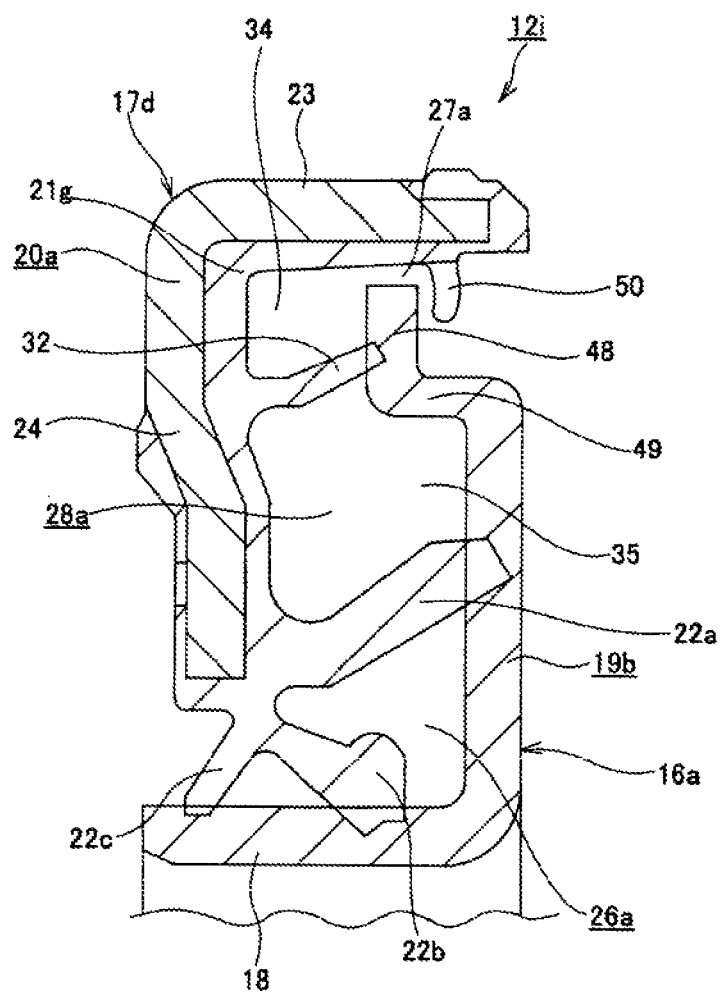
FIG. 10 illustrates a ninth embodiment of the present invention, and is similar to FIG. 1.

FIG. 10 illustrates a ninth embodiment of the present invention. In a case of a seal ring 17d configuring a combination seal ring 12i which is incorporated in the rolling bearing unit with the combination seal ring of the present embodiment, a locking lip 50 in a state of projecting radially inward is intermittently disposed in the circumferential direction in an inner diameter side portion of the portion close to the distal end of the stationary side cylindrical portion 23 within a portion covering the inner peripheral surface of the stationary side cylindrical portion 23 of the metal insert 20a, which is a portion of an elastic member 21g. Accordingly, the locking lip 50 is present on a side axially opposite to the stationary side annular portion 24 of the metal insert 20a, across a rotary side annular portion 19b of the slinger 16a. In addition, the inner diameter of the locking lip 50 is smaller than the outer diameter of the rotary side annular portion 19b. Accordingly, the distal end portion of the locking lip 50 and the distal end portion of the rotary side annular portion 19b are axially overlapped with each other. Then, based on engagement between the distal end portion of the locking lip 50 and the distal end portion of the rotary side annular portion 19b, even before both of these are attached to a predetermined portion, the present embodiment intends to prevent separation between the slinger 16a and the seal ring 17d which configure the combination seal ring 12i. The locking lip 50 is intermittently disposed in the circumferential direction. Therefore, the locking lip 50 has moderate elasticity, and thus there is no possibility that the locking lip 50 may hinder the discharge of the foreign matters permeating the inside of the small space close to the opening 34.

The configuration and the operation of the other elements are the same as those in the above-described eighth embodiment. Therefore, the same reference numerals are given to the same elements, and repeated description will be omitted.

[Tenth Embodiment]

Figure 11:
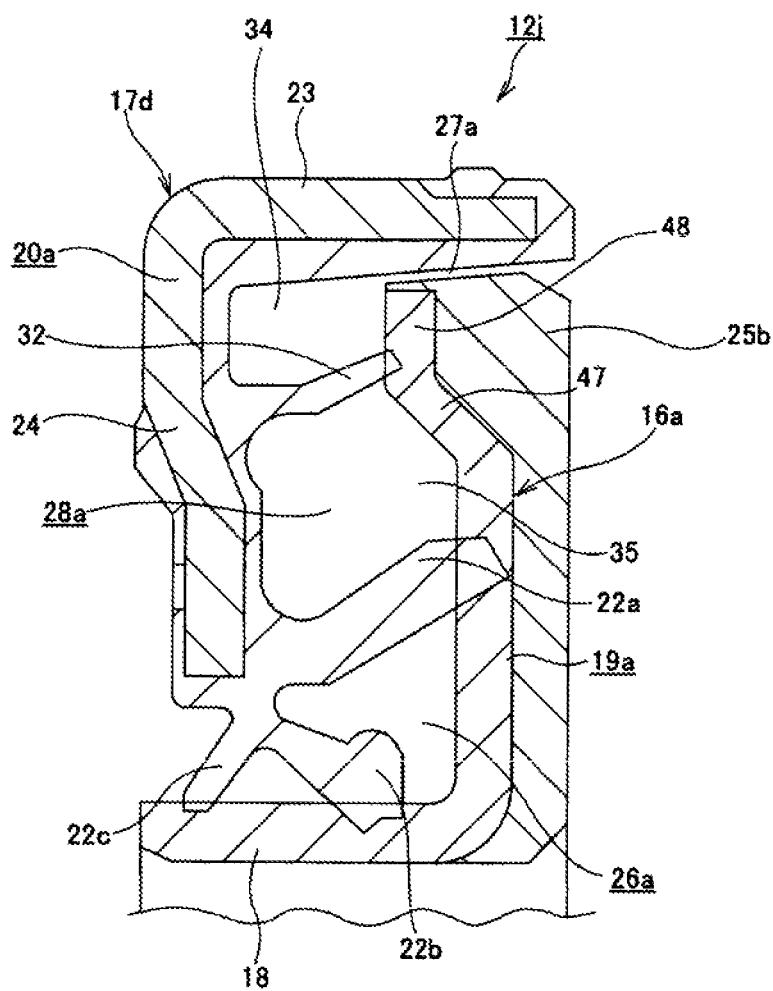
FIG. 11 illustrates a tenth embodiment of the present invention, and is similar to FIG. 1.

FIG. 11 illustrates a tenth embodiment of the present invention. In a case of the slinger 16a configuring a combination seal bearing 12j which is incorporated in the rolling bearing unit with the combination seal ring of the present embodiment, an encoder 25b made of a permanent magnet is fixedly attached to the inboard side surface of the rotary side annular portion 19a over the entire periphery. In addition, a portion having the largest outer diameter portion within the outer peripheral surface of the encoder 25b is disposed in a portion close to the inboard side of the axially intermediate portion of the outer peripheral surface. Therefore, it is possible to prevent the foreign matters such as the muddy water adhering to the inboard side surface of the encoder 25b from permeating the inside of the labyrinth seal 27a after being moved to the outer peripheral edge portion of the encoder 25b by centrifugal force based on the rotation of the hub 3 (refer to FIG. 18).

The properties of the encoder 25b, the operation and the effect of disposing the encoder 25b are the same as those in the above-described second embodiment illustrated in FIG. 3. The configuration and the operation of the other elements are the same as those in the above-described seventh embodiment illustrated in FIG. 8. Therefore, the same reference numerals are given to the same elements, and repeated description will be omitted.

[Eleventh Embodiment]

Figure 12:
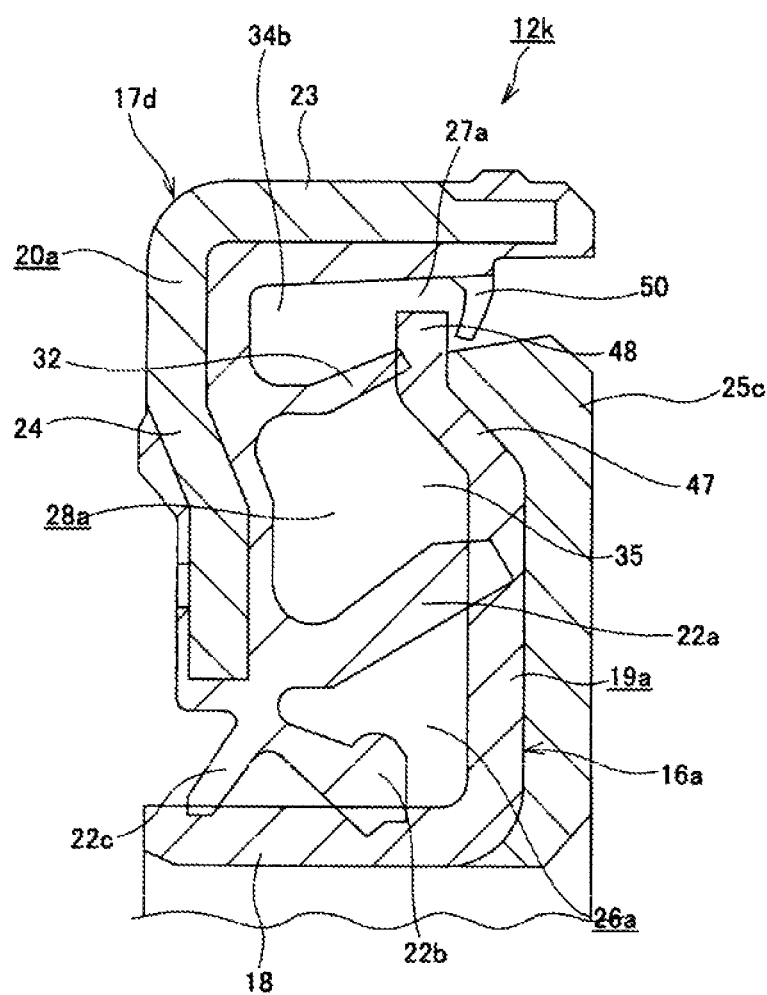
FIG. 12 illustrates an eleventh embodiment of the present invention, and is similar to FIG. 1.

FIG. 12 illustrates an eleventh embodiment of the present invention. In a case of the slinger 16a configuring a combination seal bearing 12k which is incorporated in the rolling bearing unit with the combination seal ring of the present embodiment, a portion having the largest outer diameter within an outer peripheral surface of an encoder 25c made of the permanent magnet which adheres to the inboard side surface of the rotary side annular portion 19a is caused to be present on the axially opposite side to the rotary side annular portion 19a across the locking lip 50.

According to the structure of the present embodiment having the above-described configuration, in a state of adhering to the encoder 25c, the foreign matters moved to the largest outer diameter portion of the encoder 25c by the centrifugal force based on the rotation of the encoder 25c are discharged to the external space without permeating the inner side of the locking lip 50 (the inside of the small space close to the opening 34b).

The configuration and the operation of the other elements are the same as those in the above-described tenth embodiment. Therefore, the same reference numerals are given to the same elements, and repeated description will be omitted.

[Twelfth Embodiment]

Figure 13:
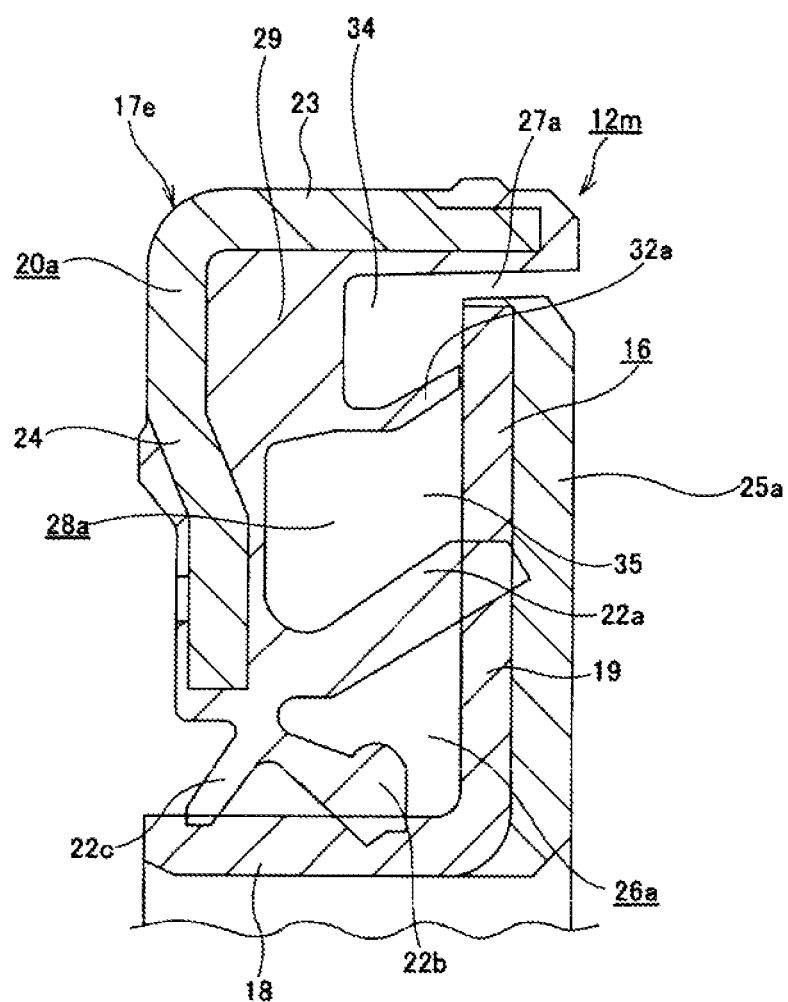
FIG. 13 illustrates a twelfth embodiment of the present invention, and is similar to FIG. 1.

FIG. 13 illustrates a twelfth embodiment of the present invention. In a case of a sealing 17e configuring a combination seal bearing 12m which is incorporated in the rolling bearing unit with the combination seal ring of the present embodiment, a shape of a proximal end portion of an auxiliary seal lip 32a is adapted to have a cylindrical shape, and a shape of an intermediate portion or a distal end edge portion is adapted to have a partially conical tubular shape. Accordingly, the intermediate portion or the distal end edge portion of the auxiliary seal lip 32a is tilted in a direction where the diameter increases as it goes toward the distal end edge. Then, the distal end edge of the auxiliary seal lip 32a is caused to closely oppose the axial side surface of the rotary side annular portion 19 over the entire periphery in a non-contact state. This structure causes the labyrinth seal to be disposed between the distal end edge of the auxiliary seal lip 32a and the outboard side surface of the rotary side annular portion 19 over the entire periphery.

According to the above-described structure of the present embodiment, in a normal state, it is possible to prevent the distal end edge of the auxiliary seal lip 32a and the outboard side surface of the rotary side annular portion 19 from rubbing against each other. Accordingly, it is possible to suppress an increase in the dynamic torque which is caused by disposing the auxiliary seal lip 32a. In contrast, if the foreign matters such as the muddy water permeate the small space close to the opening 34 from the labyrinth seal 27a, the auxiliary seal lip 32a is elastically deformed radially inward by being pressed by the foreign matters. Then, the distal end edge of the auxiliary seal lip 32a comes into sliding contact with the outboard side surface of the rotary side annular portion 19 over the entire periphery or in a portion where the foreign matters are present. As a result, there is no possibility that the foreign matters permeate the small space close to the opposite side of the opening 35 which is present on the further inner diameter side than the auxiliary seal lip 32a. In addition, the foreign matters blocked in the outer peripheral surface portion of the auxiliary seal lip 32a in this manner are caused to flow along the tilting of the outer peripheral surface of the auxiliary seal lip 32a. Then, the foreign matters are pulled by the flow of the air which is caused by the rotation of the rotary side annular portion 19 (by a shaking effect of the slinger 16), and are discharged to the external space from the labyrinth seal 27a.

The configuration and the operation of the other elements are the same as those in the above-described second embodiment illustrated in FIG. 3. Therefore, the same reference numerals are given to the same elements, and repeated description will be omitted.

[Thirteenth Embodiment]

Figure 14:
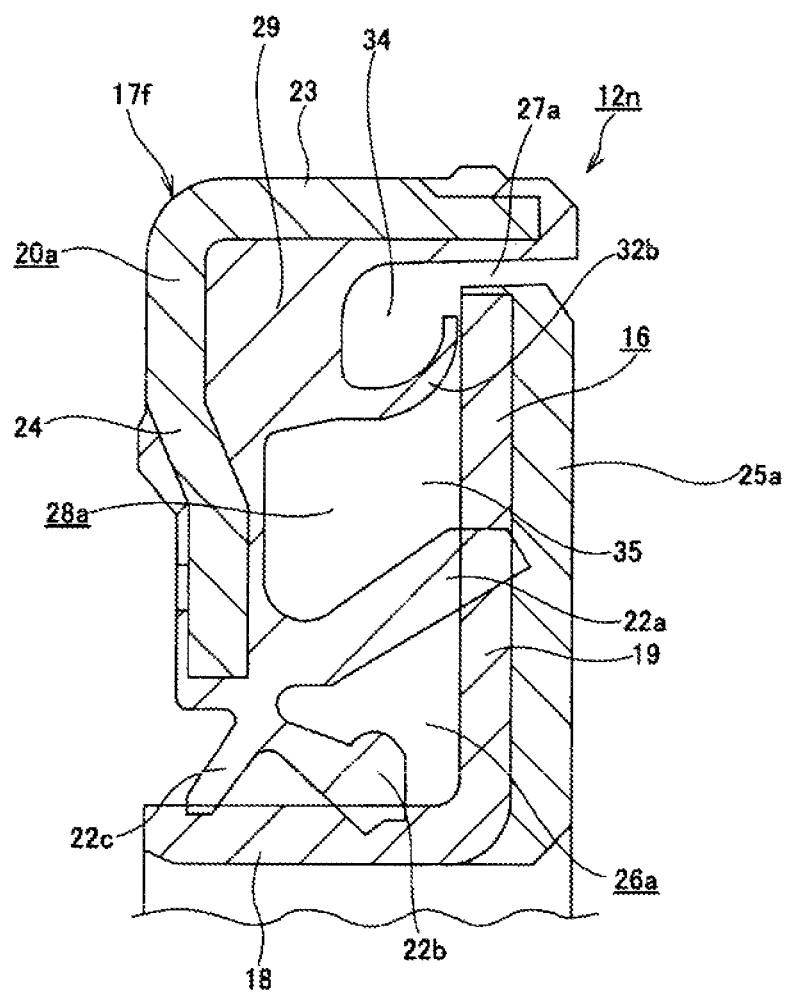
FIG. 14 illustrates a thirteenth embodiment of the present invention, and is similar to FIG. 1.

FIG. 14 illustrates a thirteenth embodiment of the present invention. In a case of a sealing 17f configuring a combination seal bearing 12n which is incorporated in the rolling bearing unit with the combination seal ring of the present embodiment, an auxiliary seal lip 32b is adapted to have an arcuate shape in cross section in which the outer peripheral surface is a concave surface. Then, in a state where a tangential direction of a portion opposing the outboard side surface of the rotary side annular portion 19 of the slinger 16 within the distal end portion of the auxiliary seal lip 32b is parallel to the outboard side surface, the portion is caused to closely oppose the outboard side surface over the entire periphery.

According to the above-described structure of the present embodiment, the entire length of the auxiliary seal lip 32b can be lengthened further than in the above-described case of the twelfth embodiment. In addition, it is possible to further increase a degree where the diameter of the distal end edge of the auxiliary seal lip 32b becomes larger than the proximal end portion. Accordingly, it is possible to appropriately weaken the rigidity of the auxiliary seal lip 32b. Then, the auxiliary seal lip 32b can be easily deflected by the foreign matters permeating the inside of the small space close to the opening 34. That is, in a state where a pressure increase is low inside the small space close to the opening 34, the distal end of the auxiliary seal lip 32b can be easily brought into sliding contact with the outboard side surface. As a result, it is possible to further improve the effect of preventing the foreign matters permeating the inside of the small space close to the opening 34 from permeating the inside of the small space close to the opposite side of the opening 35.

The configuration and the operation of the other elements are the same as those in the above-described twelfth embodiment. Therefore, the same reference numerals are given to the same elements, and repeated description will be omitted.

[Fourteenth Embodiment]

Figure 15:
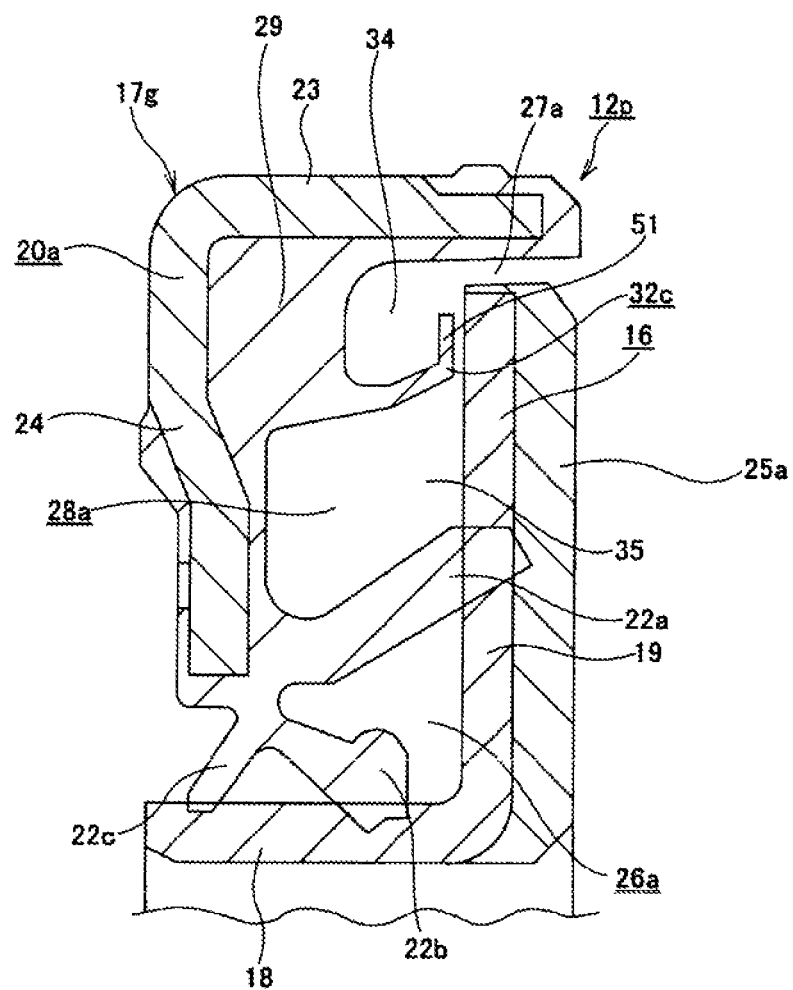
FIG. 15 illustrates a fourteenth embodiment of the present invention, and is similar to FIG. 1.

FIG. 15 illustrates a fourteenth embodiment of the present invention. In a case of a sealing 17g configuring a combination seal bearing 12p which is incorporated in the rolling bearing unit with the combination seal ring of the present embodiment, an auxiliary seal lip 32c is adapted to include an annular flange portion 51 which is bent radially outward from the distal end edge of the intermediate portion having a partially conical tubular shape. Then, the flange portion 51 and the outboard side surface of the rotary side annular portion 19 are caused to closely oppose each other over the entire periphery.

The configuration and the operation of the other elements are the same as those in the above-described thirteenth embodiment. Therefore, the same reference numerals are given to the same elements, and repeated description will be omitted.

[Fifteenth Embodiment]

Figure 16:
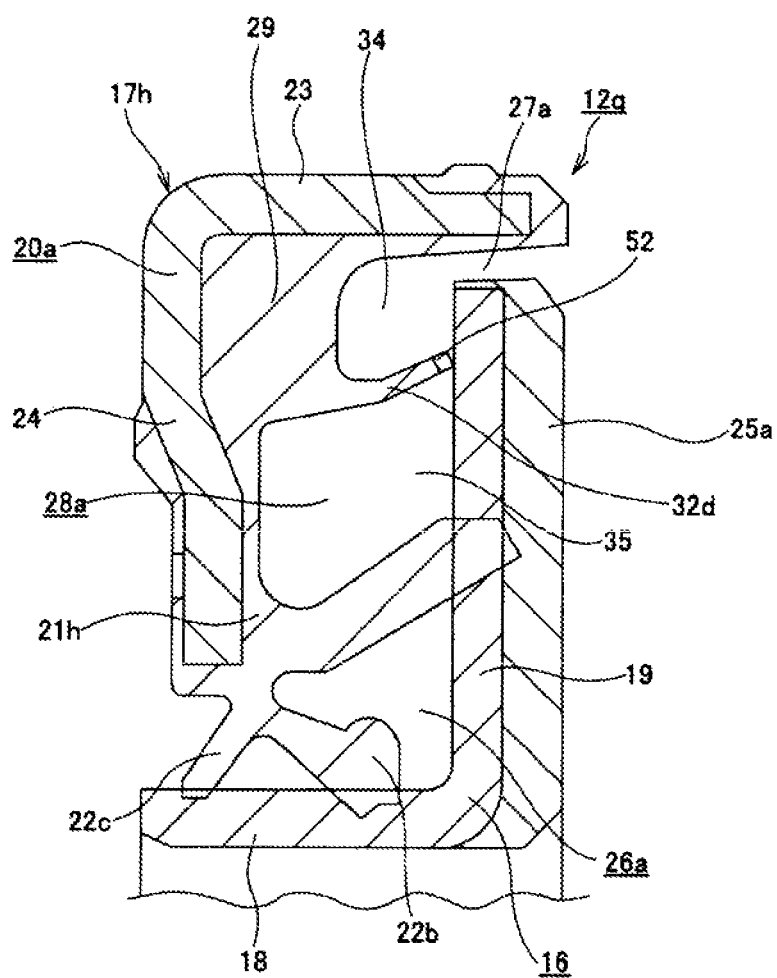
FIG. 16 illustrates a fifteenth embodiment of the present invention, and is similar to FIG. 1.
Figure 17A:
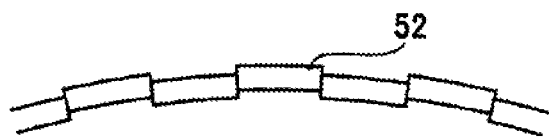
FIG. 17A illustrates an example of an uneven shape to be formed in a distal end edge of an auxiliary seal lip and is a partial enlarged view of the distal end edge.
Figure 17B:
FIG. 17B illustrates another example of an uneven shape to be formed in a distal end edge of an auxiliary seal lip and is a partial enlarged view of the distal end edge.
Figure 17C:
FIG. 17C illustrates another example of an uneven shape to be formed in a distal end edge of an auxiliary seal lip and is a partial enlarged view of the distal end edge.
Figure 17D:
FIG. 17D illustrates another example of an uneven shape to be formed in a distal end edge of an auxiliary seal lip and is a partial enlarged view of the distal end edge.
Figure 17E:
FIG. 17E illustrates another example of an uneven shape to be formed in a distal end edge of an auxiliary seal lip and is a partial enlarged view of the distal end edge.
Figure 17F:
FIG. 17F illustrates another example of an uneven shape to be formed in a distal end edge of an auxiliary seal lip and is a partial enlarged view of the distal end edge.

FIGS. 16 to 17F illustrate a fifteenth embodiment of the present invention. In a case of a seal ring 17h configuring a combination seal ring 12q which is incorporated in the rolling bearing unit with the combination seal ring of the present embodiment, within a distal end edge 52 of an auxiliary seal lip 32d, a circumferential shape of a portion coming into sliding contact with the outboard side surface of the rotary side annular portion 19 of the slinger 16 is adapted to be an uneven shape. Then, the distal end edge 52 is intermittently brought into sliding contact with the outboard side surface in the circumferential direction.

In particular, it does not matter which shape is suitable for the uneven shape of the distal end edge 52. For example, it is possible to employ a shape where rectangular recesses and projections are alternately and continuously formed as illustrated in FIG. 17A, a wave shape having a sine curve as illustrated in FIG. 17B, a shape where an underfill portion is intermittently formed in only one end edge which comes into sliding contact with one axial side surface within the distal end edge 52 as illustrated in FIG. 17C, a shape where only the shape of one end edge is adapted to be a wave shape as illustrated in FIG. 17D, a hypocycloid curve shape as illustrated in FIG. 17E, or an epicycloid curve shape as illustrated in FIG. 17F. The shapes illustrated in FIGS. 17D, 17E and 17F may be employed in the entire distal end edge 52, or may be employed in only one end edge which comes into sliding contact with one axial side surface. Even if any shape is employed, only each convex portion within the distal end edge 52 comes into sliding contact with the outboard side surface of the rotary side annular portion 19, and multiple minute clearances are intermittently present in the circumferential direction, between each recess and the outboard side surface.

In the case of the structure of the present embodiment, even if the foreign matters such as the muddy water permeates the small space close to the opposite side of the opening 35, the foreign matters can be easily discharged by employing the above-described configuration. That is, for example, in the above-described second embodiment illustrated in FIG. 3, the auxiliary seal lip 32 is in light sliding contact with the outboard side surface of the rotary side annular portion 19. Accordingly, a possibility that the foreign matters such as the muddy water may permeate the inside of the small space close to the opposite side of the opening 35 cannot be denied. If the foreign matters permeate, the foreign matters are less likely to be discharged outward. In contrast, in the case of the present embodiment, the distal end edge 52 is adapted to have the uneven shape. In this manner, multiple minute paths can be disposed between the distal end edge 52 and the outboard side surface. Then, the foreign matters permeating the inside of the small space close to the opposite side of the opening 35 can be discharged to the external space through the respective minute paths while keeping a good balance with the shaking effect obtained by the rotation of the rotary side annular portion 19. Therefore, even in long-term use, it is possible to prevent a large amount of foreign matters from being accumulated inside the small space close to the opposite side of the opening 35. Thus, it is possible to maintain a function of the combination seal ring 12q over a long period of time.

The configuration and the operation of the other elements are the same as those in the second embodiment, for example. Therefore, the same reference numerals are given to the same elements, and repeated description will be omitted.

Within the distal end edge 52, the portion coming into sliding contact with the outboard side surface of the rotary side annular portion 19 is not necessarily configured so that the circumferential direction is the uneven shape during the molding. That is, an elastic member 21h including the auxiliary seal lip 32 is manufactured by using a material having a slightly (approximately 5%) swelling properties with respect to water of nitrile rubber, and the distal end edge 52 is formed to be extremely thin. Then, the distal end edge 52 is swelled by moisture adhering to the distal end edge 52. In this manner, the distal end edge 52 can be adapted to have the uneven shape. In addition, if the elastic member 21h is manufactured by using the material having the swelling properties, when the moisture adheres to the distal end edge 52, the distal end edge 52 is caused to expand so as to increase the interference with the outboard side surface of the rotary side annular portion 19 or so as to decrease the clearance. In this manner, it is possible to further improve the effect of preventing the foreign matters from permeating. In contrast, in a dried state, the distal end edge 52 is caused to shrink so as to decrease the interference or so as to increase the clearance. In this manner, it is possible to reduce sliding resistance caused by the auxiliary seal lip 32d.

The present application has been described in detail with reference to specific embodiments. However, it is apparent to those skilled in the art that the present application can be modified or amended in various ways without departing from the spirit and the scope of the present invention.

The present application is made based on Japanese Patent Application No. 2011-260400 filed on Nov. 29, 2011. Japanese Patent Application No. 2012-112579 filed on May 16, 2012 and Japanese Patent Application No. 2012-156691 filed on Jul. 12, 2012, the entire contents of which are incorporated herein by reference.

INDUSTRIAL APPLICABILITY

When considering that an operation and an effect thereof can be sufficiently obtained, it is the most preferable to embody a rolling bearing unit with a combination seal ring of the present invention as a rolling bearing unit for supporting wheels which supports the wheels of a vehicle with respect to a suspension device. However, as long as any application needs to prevent foreign matters from permeating, the present invention can be embodied without being limited to the rolling bearing unit for supporting the wheels.

In addition, even when being applied to the rolling bearing unit for supporting the wheels, in a case of the rolling bearing unit for supporting the wheels which is incorporated in a semi-floating suspension system, for example, not only inboard side sealing means but also outboard side sealing means are configured to be the combination seal ring, in some cases. In this case, if necessary, the combination seal ring which is an aspect of the present invention is also incorporated on the outboard side of the rolling bearing unit for supporting the wheels. In this case, the inboard and outer sides with regard to the combination seal ring are opposite to those in the foregoing description.

In addition, it is also possible to combine the structure of the fourth and fifth embodiments illustrated in FIGS. 5 and 6, or any structure of the seventh to eleventh embodiments illustrated in FIGS. 8 to 12, with any structure of the twelfth to fifteenth embodiments illustrated in FIGS. 13 to 17F.

Furthermore, the present invention can also be applied to a rolling bearing unit with an outer ring rotation type seal ring. In this case, a slinger is fixedly fitted to an outer diameter side ball bearing member which is rotated when in use, and a seal ring is fixedly fitted to an inner side ball bearing member which is not rotated even when in use. Accordingly, the inboard and outer sides are opposite to those in the respectively illustrated embodiments.

DESCRIPTION OF REFERENCE NUMERALS AND SIGNS 1 rolling bearing unit
2 outer ring
3 hub
4 outer ring race
5 inner ring race
6 ball
7 retainer
8 stationary side flange 9 rotary side flange
10 bearing internal space
11 bearing seal ring
12, 12a to 12k, 12m to 12q combination seal ring
13 metal insert
14 elastic member
15a, 15b, 15c seal lip
16, 16a slinger
17, 17a to 17h seal ring
18 rotary side cylindrical portion
19, 19a, 19b rotary side annular portion
20, 20a, 20b, 20c metal insert
21, 21a to 21h elastic member
22a, 22b, 22c seal lip
23, 23a stationary side cylindrical portion
24, 24a, 24b stationary side annular portion
25, 25a, 25b, 25c encoder
26, 26a seal internal space
27, 27a, 27b labyrinth seal
28, 28a space close to outside
29, 29a thickened portion
30 stepped surface
31 outer diameter side curved surface
32, 32a, 32b, 32c, 32d auxiliary seal lip
33 inner diameter side curved surface
34, 34a, 34b small space close to opening
35 small space close to opposite side of opening
36 projection
37 tilted surface
38 tilted surface
39 proximal end side annular portion
40 outer diameter side tilted portion
41 distal end side annular portion
42 inner diameter side tilted portion
43 small recess
44 projection
45 recess
46 projection
47 tilted portion
48 distal end side flat plate portion
49 step portion
50 locking lip
51 flange portion
52 distal end edge

The invention claimed is:

1. A rolling bearing unit with a combination seal ring, comprising:
 a rotary side race ring and a stationary side race ring, relatively rotated in a state of being arranged concentrically with each other;
 multiple rolling elements disposed to be rollable between a rotary side race and a stationary side race, the rotary side race and the stationary side race being respectively disposed on a peripheral surface where the rotary side race ring and the stationary side race ring oppose each other; and
 a combination seal ring closing an end portion opening of a bearing internal space located between the peripheral surfaces where the rotary side race ring and the stationary side race ring oppose each other, the combination seal ring including a slinger and a seal ring, wherein:
 the slinger is fixedly fitted to a portion opposing the peripheral surface of the stationary side race ring within a portion of the peripheral surface of the rotary side race ring, the slinger has an annular shape whose cross-section has an L-shape, and the slinger includes: a rotary side cylindrical portion; and a rotary side annular portion radially bent from an axial end edge of the rotary side cylindrical portion toward the stationary side race ring;
 the rotary side cylindrical portion is fitted to the peripheral surface of the rotary side race ring to fix the rotary side cylindrical portion to the rotary side race ring;
 the seal ring is fixedly fitted to a portion opposing the slinger within a portion of the stationary side race ring, and the seal ring includes: a metal insert being fixedly fitted to the stationary side race ring; and an elastic member, whose proximal end portion is supported by the metal insert, having respective multiple seal lips;
 the metal insert has an annular shape whose cross-section has an L-shape, and the metal insert includes: a stationary side cylindrical portion; and a stationary side annular portion radially bent from an axial end edge of the stationary side cylindrical portion toward the rotary side race ring;
 the stationary side cylindrical portion is fitted to the peripheral surface of the stationary side race ring to fix the stationary side cylindrical portion to the stationary side race ring;
 a distal end portion of the respective seal lips is brought into sliding contact with a surface of the slinger over an entire periphery;
 a labyrinth seal is disposed between a distal end side peripheral edge of the rotary side annular portion and the peripheral surface of the stationary side cylindrical portion;
 an auxiliary seal lip is disposed integrally with the elastic member in a portion closer to the stationary side cylindrical portion than the respective multiple seal lips within a base of the elastic member, rigidity of the auxiliary seal lip is lower than one seal lip of the multiple seal lips close to an external space outside of the seal ring, the one seal lip being closest to the labyrinth seal within the respective multiple seal lips, and a distal end edge of the auxiliary seal lip is brought into sliding contact with or caused to closely oppose an axial side surface of the rotary side annular portion over the entire periphery;
 a thickness of the proximal end portion of the auxiliary seal lip is set to be one half to one fifth of a thickness of the proximal end portion of the one seal lip close to the external space; and
 the proximal end portion of the auxiliary seal lip is positioned in a portion closer to the rotary side annular portion than the proximal end portion of the one seal lip close to the external space, wherein:
 a peripheral surface of a side, having the stationary side annular portion within the stationary side cylindrical portion, is covered by the elastic member;
 both inner and outer peripheral edge portions of a portion covering an axial side surface of the stationary side annular portion within the elastic member, a portion covering the peripheral surface, and a base of the auxiliary seal lip are formed smoothly and continuously by a curved surface whose cross-section has a quarter arcuate shape;
 a thickened portion whose radial and axial thickness dimension is larger than a thickness dimension of other portions is disposed in a portion where one radial side and one axial side are partitioned by the peripheral surface of the stationary side cylindrical portion and the axial side surface of the stationary side annular portion, within a portion of the elastic member;

a proximal end portion of the auxiliary seal lip is continuously formed in a portion close to the respective multiple seal lips in the radial direction within an axially inner end surface of the thicken portion;

the axially inner end surface of the thickened portion and the portion covering the peripheral surface are formed as a curved surface whose cross-sectional shape is a quarter arcuate shape, and a radius of curvature R1 of the cross-sectional shape is set to be the same as a radial width dimension W the labyrinth seal or larger (R1>W); and the axially inner end surface of the thickened portion and the base of the auxiliary seal lip are formed as a curved surface whose cross-sectional shape is a quarter arcuate shape, and a radius of curved R2 of the cross-sectional shape is set to be the same as a thickness T of the base of the auxiliary seal lip or larger (R2>T).

2. The rolling bearing unit with a combination seal ring according to claim 1, wherein in a state where the seal ring and the slinger are combined and a distal end portion of the one seal lip close to the external space is brought into elastic contact with a radially extended side surface of the rotary side annular portion, a distal end edge of the one seal lip close to the external space is inserted into one side peripheral surface of the auxiliary seal lip through the labyrinth seal, and a fluid pressing the other side peripheral surface of the auxiliary seal lip causes the auxiliary seal lip to be close so as not to be radially inverted.

3. The rolling bearing unit with a combination seal ring according to claim 1, wherein:

recesses, respectively opened on the axial end surface of the thickened portion, are formed in multiple places in the circumferential direction of a radially intermediate portion of the thickened portion; and the proximal end portion of the auxiliary seal lip is positioned in a portion closer to the respective multiple seal lips than the respective recesses within the axial end surface of the thickened portion.

4. The rolling bearing unit with a combination seal ring according to claim 1, wherein the stationary side annular portion is caused to have a stepped shape including a proximal end side annular portion closest to the stationary side cylindrical portion in the radial direction, a tilted portion having a partially conical shape tilted in a direction away from the rotary side annular portion toward the distal end side, continuously in the radial direction from a distal end side peripheral edge of the proximal end side annular portion, and a distal end side annular portion continuously formed in the radial direction from a distal end side peripheral edge of the tilted portion, the distal end side annular portion being parallel to the proximal end side annular portion; and the proximal end portion of the auxiliary seal lip is positioned in a distal end side portion of the proximal end side annular portion.

5. The rolling bearing unit with a combination seal ring according to claim 1, wherein a projection axially projects toward the rotary side annular portion is formed in a radially intermediate portion of the stationary side annular portion over the entire periphery, and the proximal end portion of the auxiliary seal lip is positioned in a distal end portion of the projection.

6. The rolling bearing unit with a combination seal ring according to claim 1, wherein:

the distal end edge of the auxiliary seal lip is in sliding contact with the axial side surface of the rotary side annular portion, and a shape in the circumferential direction of at least a portion in sliding contact with the axial side surface within the distal end edge is an uneven shape; and the distal end edge is intermittently in sliding contact with the axial side surface in the circumferential direction.

7. The rolling bearing unit with a combination seal ring according to claim 1, wherein:

the distal end portion of the rotary side annular portion is positioned on the further stationary side annular portion than the intermediate portion or the proximal end portion by bending a portion close to a distal end of a radially intermediate portion of the rotary side annular portion over the entire periphery in the thickness direction of the rotary side annular portion, and the distal end edge of the auxiliary seal lip is brought into sliding contact with or caused to closely oppose the axial side surface of the distal end portion of the rotary side annular portion over the entire periphery, a portion of the elastic member is disposed in a state of covering a peripheral surface that is the opposite side to the stationary side race ring within both inner and outer peripheral surfaces of the stationary side cylindrical portion;

a locking lip, radially projecting toward the rotary side cylindrical portion from a portion being the opposite side to the stationary side annular portion across the distal end portion of the rotary side annular portion within the elastic member which covers peripheral surfaces thereof, is intermittently disposed in the circumferential direction;

the slinger and the seal ring are prevented from being separated from each other by axially overlapping the distal end portion of the locking lip and the distal end portion of the rotary side annular portion with each other;

an encoder made of a permanent magnet, formed in an overall annular shape by dispersing magnetic powder in a high polymer material, is fixedly attached to an opposite side surface to a surface opposing the stationary side annular portion within both axial side surfaces of the rotary side annular portion; and a peripheral edge of the encoder is caused to oppose a peripheral surface of the stationary side cylindrical portion, and a labyrinth seal is disposed in the portion.

8. The rolling bearing unit with a combination seal ring according to claim 7, wherein:

a portion of the high polymer material configuring the encoder is used to form a projection projecting toward the stationary side annular portion side by crossing over a distal end side peripheral edge of the rotary side annular portion over the entire periphery;

a labyrinth seal is provided by including a portion between a peripheral surface of the projection and a peripheral surface of the stationary side annular portion; and the distal end portion of the projection and the outer diameter side curved surface oppose each other.

9. The rolling bearing unit with a combination seal ring according to claim 7, wherein:

the rotary side race ring is an inner diameter side race ring present on a radially inner side, and the stationary side race ring is an outer diameter side race ring present on a radially outer side; and a portion whose outer diameter is the largest within an outer peripheral surface of the encoder is present on an axially opposite side to the rotary side annular portion across the locking lip.

10. The roller bearing unit with a combination seal ring according to claim 1, wherein a volume of the small space close to the opening is smaller than a volume of the small space close to the opposite side of the opening; and the inner peripheral surface of the thickened portion has a partially conical shape.

* * * * *